US010236760B2

(12) United States Patent
Moussette et al.

(10) Patent No.: US 10,236,760 B2
(45) Date of Patent: Mar. 19, 2019

(54) MAGNETIC ACTUATORS FOR HAPTIC RESPONSE

(71) Applicant: Apple Inc., Cupertino, CA (US)

(72) Inventors: Camille Moussette, Cupertino, CA (US); John B. Morrell, Cupertino, CA (US); Patrick Kessler, San Francisco, CA (US); Samuel Weiss, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 393 days.

(21) Appl. No.: 15/025,425

(22) PCT Filed: Sep. 30, 2013

(86) PCT No.: PCT/US2013/062556
§ 371 (c)(1),
(2) Date: Mar. 28, 2016

(87) PCT Pub. No.: WO2015/047372
PCT Pub. Date: Apr. 2, 2015

(65) Prior Publication Data
US 2016/0211736 A1    Jul. 21, 2016

(51) Int. Cl.
*G06F 3/01* (2006.01)
*H02K 33/16* (2006.01)
(Continued)

(52) U.S. Cl.
CPC .............. *H02K 33/16* (2013.01); *G06F 3/01* (2013.01); *G06F 3/016* (2013.01); *H02K 1/34* (2013.01); *H02K 7/108* (2013.01)

(58) Field of Classification Search
CPC .................................. G06F 3/01; G06F 3/016
(Continued)

(56) References Cited

U.S. PATENT DOCUMENTS 3,001,049 A   9/1961  Didier
3,390,287 A   6/1968  Sonderegger
(Continued)

FOREIGN PATENT DOCUMENTS

AU   2015100710   7/2015
AU   2016100399   5/2016
(Continued)

OTHER PUBLICATIONS

U.S. Appl. No. 15/800,630, filed Nov. 1, 2017, Morrell et al.
(Continued)

*Primary Examiner* — Brent Swarthout
(74) *Attorney, Agent, or Firm* — Brownstein Hyatt Farber Schreck, LLP

(57) ABSTRACT

In an embodiment, an actuator or circuit includes elements moveably coupled via bearings positioned between curved grooves. The bearings and the curves may exert a restorative force to return the elements to an original position after movement and may be spherical, cubic, cylindrical, and/or include gears that interact with groove gears. In some embodiments, an electrical coil may be coplanar with a surface of an element and a hard magnet may be positioned in the center and be polarized to stabilize or destabilize the element with respect to another element. In various embodiments, a magnetic circuit includes an element with an electrical coil wrapped in multiple directions around the element. In some embodiments, an actuator includes attraction elements and exertion of force causes an element to approach, contact, and/or magnetically attach to one of the attraction elements.

20 Claims, 25 Drawing Sheets

(51) Int. Cl.
*H02K 1/34* (2006.01)
*H02K 7/108* (2006.01)

(58) Field of Classification Search
USPC .......................................... 340/407.1, 407.2
See application file for complete search history.

(56) References Cited

U.S. PATENT DOCUMENTS

| | | |
|---|---|---|
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |
| 4,695,813 A | 9/1987 | Nobutoki et al. |
| 4,975,616 A | 12/1990 | Park |
| 5,010,772 A | 4/1991 | Bourland |
| 5,245,734 A | 9/1993 | Issartel |
| 5,283,408 A | 2/1994 | Chen |
| 5,293,161 A | 3/1994 | MacDonald et al. |
| 5,317,221 A | 5/1994 | Kubo et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A | 10/1999 | Lo et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,069,433 A | 5/2000 | Lazarus et al. |
| 6,078,308 A | 6/2000 | Rosenberg et al. |
| 6,127,756 A | 10/2000 | Iwaki |
| 6,135,886 A | 10/2000 | Armstrong |
| 6,218,966 B1 | 4/2001 | Goodwin |
| 6,220,550 B1 | 4/2001 | McKillip, Jr. |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,091,948 B2 | 8/2006 | Chang et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,180,500 B2 | 2/2007 | Marvit et al. |
| 7,182,691 B1 | 2/2007 | Schena |
| 7,194,645 B2 | 3/2007 | Bieswanger et al. |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,269,484 B2 | 9/2007 | Hein |
| 7,333,604 B2 | 2/2008 | Zernovizky et al. |
| 7,334,350 B2 | 2/2008 | Ellis |
| 7,348,968 B2 | 3/2008 | Dawson |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,155 B2 | 12/2008 | Chu |
| 7,469,595 B2 | 12/2008 | Kessler et al. |
| 7,471,033 B2 | 12/2008 | Thiesen et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,575,368 B2 | 8/2009 | Guillaume |
| 7,586,220 B2 | 9/2009 | Roberts |
| 7,619,498 B2 | 11/2009 | Miura |
| 7,639,232 B2 | 12/2009 | Grant et al. |
| 7,641,618 B2 | 1/2010 | Noda et al. |
| 7,649,305 B2 | 1/2010 | Priya et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,737,828 B2 | 6/2010 | Yang et al. |
| 7,742,036 B2 | 6/2010 | Grant et al. |
| 7,788,032 B2 | 8/2010 | Moloney |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,886,621 B2 | 2/2011 | Smith et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,031,172 B2 | 10/2011 | Kruse et al. |
| 8,044,940 B2 | 10/2011 | Narusawa |
| 8,069,881 B1 | 12/2011 | Cunha |
| 8,077,145 B2 | 12/2011 | Rosenberg et al. |

(56) References Cited

U.S. PATENT DOCUMENTS

| | | |
|---|---|---|
| 8,081,156 B2 | 12/2011 | Ruettiger |
| 8,082,640 B2 | 12/2011 | Takeda |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,169,401 B2 | 5/2012 | Hardwick |
| 8,174,372 B2 | 5/2012 | da Costa |
| 8,179,202 B2 | 5/2012 | Cruz-Hernandez et al. |
| 8,188,623 B2 | 5/2012 | Park et al. |
| 8,205,356 B2 | 6/2012 | Ellis |
| 8,210,942 B2 | 7/2012 | Shimabukuro et al. |
| 8,232,494 B2 | 7/2012 | Purcocks |
| 8,242,641 B2 | 8/2012 | Bae |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,344,834 B2 | 1/2013 | Niiyama |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,316 B2 | 2/2013 | Houston et al. |
| 8,384,679 B2 | 2/2013 | Paleczny et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,411,058 B2 | 4/2013 | Wong et al. |
| 8,446,264 B2 | 5/2013 | Tanase |
| 8,451,255 B2 | 5/2013 | Weber et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,545,322 B2 | 10/2013 | George et al. |
| 8,547,341 B2 | 10/2013 | Takashima et al. |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,596,755 B2 | 12/2013 | Hibi |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,629,843 B2 | 1/2014 | Steeves et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,682,396 B2 | 3/2014 | Yang et al. |
| 8,686,952 B2 | 4/2014 | Pope et al. |
| 8,710,966 B2 | 4/2014 | Hill |
| 8,723,813 B2 | 5/2014 | Park et al. |
| 8,735,755 B2 | 5/2014 | Peterson et al. |
| 8,760,273 B2 | 6/2014 | Casparian et al. |
| 8,780,060 B2 | 7/2014 | Maschmeyer et al. |
| 8,787,006 B2 | 7/2014 | Golko et al. |
| 8,797,152 B2 | 8/2014 | Henderson et al. |
| 8,798,534 B2 | 8/2014 | Rodriguez et al. |
| 8,803,842 B2 | 8/2014 | Wakasugi et al. |
| 8,836,502 B2 | 9/2014 | Culbert et al. |
| 8,845,071 B2 | 9/2014 | Yamamoto et al. |
| 8,857,248 B2 | 10/2014 | Shih et al. |
| 8,860,562 B2 | 10/2014 | Hill |
| 8,861,776 B2 | 10/2014 | Lastrucci |
| 8,866,600 B2 | 10/2014 | Yang et al. |
| 8,890,668 B2 | 11/2014 | Pance et al. |
| 8,918,215 B2 | 12/2014 | Bosscher et al. |
| 8,928,621 B2 | 1/2015 | Ciesla et al. |
| 8,948,821 B2 | 2/2015 | Newham et al. |
| 8,952,937 B2 | 2/2015 | Shih et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,035,887 B1 | 5/2015 | Prud'Hommeaux et al. |
| 9,072,576 B2 | 7/2015 | Nishiura |
| 9,083,821 B2 | 7/2015 | Hughes |
| 9,092,129 B2 | 7/2015 | Abdo et al. |
| 9,098,991 B2 | 8/2015 | Park et al. |
| 9,117,347 B2 | 8/2015 | Matthews |
| 9,122,325 B2 | 9/2015 | Peshkin et al. |
| 9,131,039 B2 | 9/2015 | Behles |
| 9,134,834 B2 | 9/2015 | Reshef |
| 9,158,379 B2 | 10/2015 | Cruz-Hernandez et al. |
| 9,178,509 B2 | 11/2015 | Bernstein |
| 9,189,932 B2 | 11/2015 | Kerdemelidis et al. |
| 9,201,458 B2 | 12/2015 | Hunt et al. |
| 9,202,355 B2 | 12/2015 | Hill |
| 9,235,267 B2 | 1/2016 | Pope et al. |
| 9,274,601 B2 | 3/2016 | Faubert et al. |
| 9,274,602 B2 | 3/2016 | Garg et al. |
| 9,274,603 B2 | 3/2016 | Modarres et al. |
| 9,275,815 B2 | 3/2016 | Hoffmann |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,317,116 B2 | 4/2016 | Ullrich et al. |
| 9,317,118 B2 | 4/2016 | Puskarich |
| 9,317,154 B2 | 4/2016 | Perlin et al. |
| 9,318,942 B2 | 4/2016 | Sugita et al. |
| 9,325,230 B2 | 4/2016 | Yamada et al. |
| 9,357,052 B2 | 5/2016 | Ullrich |
| 9,360,944 B2 | 6/2016 | Pinault |
| 9,390,599 B2 | 7/2016 | Weinberg |
| 9,396,434 B2 | 7/2016 | Rothkopf |
| 9,405,369 B2 | 8/2016 | Modarres et al. |
| 9,411,423 B2 | 8/2016 | Heubel |
| 9,417,695 B2 | 8/2016 | Griffin et al. |
| 9,449,476 B2 | 9/2016 | Lynn |
| 9,477,342 B2 | 10/2016 | Daverman et al. |
| 9,501,912 B1 | 11/2016 | Havskjold et al. |
| 9,594,450 B2 | 7/2017 | Lynn et al. |
| 9,778,743 B2 | 10/2017 | Grant et al. |
| 9,779,592 B1 | 10/2017 | Hoen |
| 9,934,661 B2 * | 4/2018 | Hill .................. H04M 1/72563 |
| 9,990,099 B2 | 6/2018 | Ham et al. |
| 2003/0210259 A1 | 11/2003 | Liu |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0014569 A1 | 1/2006 | DelGiorno |
| 2006/0154674 A1 | 7/2006 | Landschaft et al. |
| 2006/0209037 A1 | 9/2006 | Wang et al. |
| 2006/0221052 A1 | 10/2006 | Harada et al. |
| 2006/0239746 A1 | 10/2006 | Grant |
| 2006/0252463 A1 | 11/2006 | Liao |
| 2007/0099574 A1 | 5/2007 | Wang |
| 2007/0152974 A1 | 7/2007 | Kim et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0158149 A1 | 7/2008 | Levin |
| 2008/0165148 A1 | 7/2008 | Williamson |

(56) References Cited

U.S. PATENT DOCUMENTS

| | | |
|---|---|---|
| 2008/0181501 A1 | 7/2008 | Faraboschi |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2008/0297328 A1* | 12/2008 | Crawford ............ G08B 6/00 340/407.2 |
| 2009/0002328 A1 | 1/2009 | Ullrich et al. |
| 2009/0115734 A1 | 5/2009 | Fredriksson et al. |
| 2009/0120105 A1 | 5/2009 | Ramsay et al. |
| 2009/0128503 A1 | 5/2009 | Grant et al. |
| 2009/0135142 A1 | 5/2009 | Fu et al. |
| 2009/0167702 A1 | 7/2009 | Nurmi |
| 2009/0167704 A1 | 7/2009 | Terlizzi et al. |
| 2009/0201608 A1 | 8/2009 | Argumedo et al. |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0267892 A1 | 10/2009 | Faubert |
| 2009/0313542 A1 | 12/2009 | Cruz-Hernandez et al. |
| 2010/0020036 A1 | 1/2010 | Hui et al. |
| 2010/0053087 A1 | 3/2010 | Dai et al. |
| 2010/0079264 A1 | 4/2010 | Hoellwarth |
| 2010/0089735 A1 | 4/2010 | Takeda et al. |
| 2010/0141408 A1 | 6/2010 | Doy et al. |
| 2010/0141606 A1 | 6/2010 | Bae et al. |
| 2010/0148944 A1 | 6/2010 | Kim et al. |
| 2010/0152620 A1 | 6/2010 | Ramsay et al. |
| 2010/0164894 A1 | 7/2010 | Kim et al. |
| 2010/0188422 A1 | 7/2010 | Shingai et al. |
| 2010/0194547 A1 | 8/2010 | Terrell et al. |
| 2010/0231508 A1 | 9/2010 | Cruz-Hernandez et al. |
| 2010/0231550 A1 | 9/2010 | Cruz-Hernandez et al. |
| 2010/0265197 A1 | 10/2010 | Purdy |
| 2010/0309141 A1 | 12/2010 | Cruz-Hernandez et al. |
| 2010/0328229 A1 | 12/2010 | Weber et al. |
| 2011/0053577 A1 | 3/2011 | Lee et al. |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0157052 A1 | 6/2011 | Lee et al. |
| 2011/0163985 A1 | 7/2011 | Bae et al. |
| 2011/0193824 A1 | 8/2011 | Modarres et al. |
| 2011/0248948 A1 | 10/2011 | Griffin et al. |
| 2011/0260988 A1 | 10/2011 | Colgate et al. |
| 2011/0263200 A1 | 10/2011 | Thornton et al. |
| 2011/0291950 A1 | 12/2011 | Tong |
| 2011/0304559 A1 | 12/2011 | Pasquero |
| 2012/0068957 A1 | 3/2012 | Puskarich et al. |
| 2012/0075198 A1 | 3/2012 | Sulem et al. |
| 2012/0092263 A1 | 4/2012 | Peterson et al. |
| 2012/0126959 A1 | 5/2012 | Zarrabi et al. |
| 2012/0127088 A1 | 5/2012 | Pance et al. |
| 2012/0133494 A1 | 5/2012 | Cruz-Hernandez et al. |
| 2012/0139844 A1 | 6/2012 | Ramstein et al. |
| 2012/0206248 A1 | 8/2012 | Biggs |
| 2012/0256848 A1 | 10/2012 | Madabusi Srinivasan |
| 2012/0268412 A1 | 10/2012 | Cruz-Hernandez et al. |
| 2012/0274578 A1 | 11/2012 | Snow et al. |
| 2012/0280927 A1 | 11/2012 | Ludwig |
| 2012/0319987 A1 | 12/2012 | Woo |
| 2012/0327006 A1 | 12/2012 | Lsrar et al. |
| 2013/0027345 A1 | 1/2013 | Binzel |
| 2013/0033967 A1 | 2/2013 | Chuang et al. |
| 2013/0063285 A1 | 3/2013 | Elias |
| 2013/0063356 A1 | 3/2013 | Martisauskas |
| 2013/0106699 A1 | 5/2013 | Babatunde |
| 2013/0141365 A1 | 6/2013 | Lynn et al. |
| 2013/0191741 A1 | 7/2013 | Dickinson et al. |
| 2013/0200732 A1 | 8/2013 | Jun et al. |
| 2013/0207793 A1 | 8/2013 | Weaber et al. |
| 2013/0217491 A1 | 8/2013 | Hilbert et al. |
| 2013/0222280 A1 | 8/2013 | Sheynblat et al. |
| 2013/0228023 A1 | 9/2013 | Drasnin et al. |
| 2013/0261811 A1 | 10/2013 | Yagi et al. |
| 2013/0300590 A1 | 11/2013 | Dietz et al. |
| 2014/0035397 A1 | 2/2014 | Endo et al. |
| 2014/0082490 A1 | 3/2014 | Jung et al. |
| 2014/0085065 A1 | 3/2014 | Biggs et al. |
| 2014/0143785 A1 | 5/2014 | Mistry et al. |
| 2014/0197936 A1 | 7/2014 | Biggs et al. |
| 2014/0232534 A1 | 8/2014 | Birnbaum et al. |
| 2014/0247227 A1 | 9/2014 | Jiang et al. |
| 2014/0267076 A1 | 9/2014 | Birnbaum et al. |
| 2014/0267952 A1 | 9/2014 | Sirois |
| 2015/0005039 A1 | 1/2015 | Liu et al. |
| 2015/0040005 A1 | 2/2015 | Faaborg |
| 2015/0090572 A1 | 4/2015 | Lee et al. |
| 2015/0169059 A1 | 6/2015 | Behles et al. |
| 2015/0192414 A1 | 7/2015 | Das et al. |
| 2015/0194165 A1 | 7/2015 | Faaborg et al. |
| 2015/0220199 A1 | 8/2015 | Wang et al. |
| 2015/0227204 A1 | 8/2015 | Gipson et al. |
| 2015/0296480 A1 | 10/2015 | Kinsey et al. |
| 2015/0324049 A1 | 11/2015 | Kies et al. |
| 2015/0349619 A1 | 12/2015 | Degner et al. |
| 2016/0049265 A1 | 2/2016 | Bernstein |
| 2016/0063826 A1 | 3/2016 | Morrell et al. |
| 2016/0071384 A1 | 3/2016 | Hill |
| 2016/0162025 A1 | 6/2016 | Shah |
| 2016/0163165 A1 | 6/2016 | Morrell et al. |
| 2016/0172953 A1 | 6/2016 | Hamel et al. |
| 2016/0195929 A1 | 7/2016 | Martinez et al. |
| 2016/0196935 A1 | 7/2016 | Bernstein |
| 2016/0206921 A1 | 7/2016 | Szabados et al. |
| 2016/0216764 A1 | 7/2016 | Morrell et al. |
| 2016/0216766 A1 | 7/2016 | Puskarich |
| 2016/0231815 A1 | 8/2016 | Moussette et al. |
| 2016/0233012 A1 | 8/2016 | Lubinski et al. |
| 2016/0241119 A1 | 8/2016 | Keeler |
| 2016/0259480 A1 | 9/2016 | Augenbergs et al. |
| 2016/0306423 A1 | 10/2016 | Uttermann et al. |
| 2016/0371942 A1 | 12/2016 | Smith, IV et al. |
| 2017/0038905 A1* | 2/2017 | Bijamov ............... G06F 3/0414 |
| 2017/0070131 A1* | 3/2017 | Degner ................. H02K 33/16 |
| 2017/0084138 A1* | 3/2017 | Hajati .................... G08B 6/00 |
| 2017/0085163 A1* | 3/2017 | Hajati ................... G06F 1/163 |
| 2017/0192507 A1 | 7/2017 | Lee et al. |
| 2017/0192508 A1 | 7/2017 | Lim et al. |
| 2017/0255295 A1 | 9/2017 | Tanemura et al. |
| 2017/0257844 A1* | 9/2017 | Miller ..................... G08B 6/00 |
| 2017/0285747 A1* | 10/2017 | Chen ...................... G08B 6/00 |
| 2017/0311282 A1 | 10/2017 | Miller et al. |
| 2017/0357325 A1* | 12/2017 | Yang ...................... G06F 3/016 |
| 2017/0364158 A1* | 12/2017 | Wen ..................... H01L 41/0986 |
| 2018/0052550 A1 | 2/2018 | Zhang et al. |
| 2018/0075715 A1* | 3/2018 | Morrell .................. G08B 6/00 |
| 2018/0081441 A1* | 3/2018 | Pedder ................... G06F 3/016 |
| 2018/0203513 A1* | 7/2018 | Rihn ................... G06F 3/04845 |

FOREIGN PATENT DOCUMENTS

| | | |
|---|---|---|
| CA | 2355434 | 2/2002 |
| CN | 1324030 | 11/2001 |
| CN | 1817321 | 8/2006 |
| CN | 101120290 | 2/2008 |
| CN | 101409164 | 4/2009 |
| CN | 101763192 | 6/2010 |
| CN | 101903848 | 12/2010 |
| CN | 101938207 | 1/2011 |
| CN | 102025257 | 4/2011 |
| CN | 201829004 | 5/2011 |
| CN | 102163076 | 8/2011 |
| CN | 102246122 | 11/2011 |
| CN | 102315747 | 1/2012 |
| CN | 102591512 | 7/2012 |
| CN | 102667681 | 9/2012 |
| CN | 102713805 | 10/2012 |
| CN | 102768593 | 11/2012 |
| CN | 102844972 | 12/2012 |
| CN | 102915111 | 2/2013 |
| CN | 103019569 | 4/2013 |
| CN | 103154867 | 6/2013 |

(56) References Cited

FOREIGN PATENT DOCUMENTS

| | | |
|---|---|---|
| CN | 103181090 | 6/2013 |
| CN | 103218104 | 7/2013 |
| CN | 103278173 | 9/2013 |
| CN | 103416043 | 11/2013 |
| CN | 103440076 | 12/2013 |
| CN | 103970339 | 8/2014 |
| CN | 104220963 | 12/2014 |
| CN | 104956244 | 9/2015 |
| CN | 105556268 | 5/2016 |
| DE | 19517630 | 11/1996 |
| DE | 10330024 | 1/2005 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2264562 A2 | 12/2010 |
| EP | 2315186 | 4/2011 |
| EP | 2374430 | 10/2011 |
| EP | 2395414 | 12/2011 |
| EP | 2461228 | 6/2012 |
| EP | 2631746 | 8/2013 |
| EP | 2434555 | 10/2013 |
| JP | H05301342 A2 | 11/1993 |
| JP | 2002199689 | 7/2002 |
| JP | 2002102799 | 9/2002 |
| JP | 200362525 | 3/2003 |
| JP | 2004236202 | 8/2004 |
| JP | 2010272903 | 12/2010 |
| JP | 2014235133 | 12/2014 |
| JP | 2016095552 | 5/2016 |
| KR | 20050033909 | 4/2005 |
| KR | 1020100046602 | 5/2010 |
| KR | 1020110101516 | 9/2011 |
| KR | 20130024420 | 3/2013 |
| TW | 200518000 | 11/2007 |
| TW | 200951944 | 12/2009 |
| TW | 201145336 | 12/2011 |
| TW | 201218039 | 5/2012 |
| TW | 201425180 | 7/2014 |
| WO | WO 97/16932 | 5/1997 |
| WO | WO 01/059588 | 8/2001 |
| WO | WO 02/073587 | 9/2002 |
| WO | WO 03/038800 | 5/2003 |
| WO | WO 06/057770 | 6/2006 |
| WO | WO 07/114631 | 10/2007 |
| WO | WO 08/075082 | 6/2008 |
| WO | WO 09/038862 | 3/2009 |
| WO | WO 09/068986 | 6/2009 |
| WO | WO 09/097866 | 8/2009 |
| WO | WO 09/122331 | 10/2009 |
| WO | WO 09/150287 | 12/2009 |
| WO | WO 10/085575 | 7/2010 |
| WO | WO 10/087925 | 8/2010 |
| WO | WO 11/007263 | 1/2011 |
| WO | WO 12/052635 | 4/2012 |
| WO | WO 12/129247 | 9/2012 |
| WO | WO 13/069148 | 5/2013 |
| WO | WO 13/169302 | 11/2013 |
| WO | WO 14/018086 | 1/2014 |
| WO | WO 13/169299 | 11/2014 |
| WO | WO 15/023670 | 2/2015 |

OTHER PUBLICATIONS

U.S. Appl. No. 15/881,476, filed Jan. 26, 2018, Moussette et al.
Astronomer's Toolbox, "The Electromagnetic Spectrum," http://imagine.gsfc.nasa.gov/science/toolbox/emspectrum1.html, updated Mar. 2013, 4 pages.
Hasser et al., "Preliminary Evaluation of a Shape-Memory Alloy Tactile Feedback Display," Advances in Robotics, Mechantronics, and Haptic Interfaces, ASME, DSC-vol. 49, pp. 73-80, 1993.
Hill et al., "Real-time Estimation of Human Impedance for Haptic Interfaces," Stanford Telerobotics Laboratory, Department of Mechanical Engineering, Stanford University, Third Joint Eurohaptics Conference and Symposium on Haptic Interfaces for Virtual Environment and Teleoperator Systems, Salt Lake City, Utah, Mar. 18-20, 2009, pp. 440-445.
Kim et al., "Tactile Rendering of 3D Features on Touch Surfaces," UIST '13, Oct. 8-11, 2013, St. Andrews, United Kingdom, 8 pages.
Lee et al, "Haptic Pen: Tactile Feedback Stylus for Touch Screens," Mitsubishi Electric Research Laboratories, http://wwwlmerl.com, 6 pages, Oct. 2004.
Invitation to Pay Additional Fees dated Apr. 9, 2014, PCT/US2013/062556, 7 pages.
International Search Report and Written Opinion dated Jun. 18, 2014, PCT/US2013/062556, 16 pages.
U.S. Appl. No. 15/583,938, filed May 1, 2017 Hill.
U.S. Appl. No. 15/621,966, filed Jun. 13, 2017, Pedder et al.
U.S. Appl. No. 15/621,930, filed Jun. 13, 2017, Wen et al.
U.S. Appl. No. 15/622,017, filed Jun. 13, 2017, Yang et al.
U.S. Appl. No. 15/641,192, filed Jul. 3, 2017, Miller et al.
Nakamura, "A Torso Haptic Display Based on Shape Memory Alloy Actuators," Massachusetts Institute of Technology, 2003, pp. 1-123.
U.S. Appl. No. 15/251,459,filed Aug. 30, 2016, Miller et al.
U.S. Appl. No. 15/260,047, filed Sep. 8, 2016, Degner.
U.S. Appl. No. 15/306,034, filed Oct. 21, 2016, Bijamov et al.
U.S. Appl. No. 15/364,822, filed Nov. 30, 2016, Chen.
U.S. Appl. No. 15/897,968, filed Feb. 15, 2018, Hill.

* cited by examiner

MAGNETIC ACTUATORS FOR HAPTIC RESPONSE

CROSS REFERENCE TO RELATED APPLICATION

This application is a 35 U.S.C. § 371 application of PCT/US2013/062556, filed on Sep. 30, 2013, and entitled "Magnetic Actuators for Haptic Response," which is incorporated by reference as if fully disclosed herein.

TECHNICAL FIELD

This disclosure relates generally to haptic devices, and more specifically to magnetic actuators that provide a haptic response.

BACKGROUND

Magnetic actuators, such as those utilized in haptic devices, typically include a first body element that is moveable with relation to a second body element. Such movement may be accomplished through direction of magnetic flux utilizing one or more electrical coils, soft magnets (a material that is not permanently magnetic but can become magnetic in response to the proximity of a magnetic force), and/or one or more hard magnets (materials that are permanently magnetic such as rare-earth magnets). The movement may cause vibrations, which may be provided to a user as haptic output or feedback.

SUMMARY

The present disclosure discloses magnetic actuators and circuits. In various embodiments, a magnetic actuator or circuit may include a moveable body or bar element that is moveably coupled to a fixed body or bar element via one or more bearings positioned between one or more grooves. In some cases the grooves may be curved such that force exerted causing lateral movement of the moveable body or bar elements cause the bearings to move upward on the curve of the groove such that the bearing moves back down the curve and restores the moveable body or bar elements to an original position after the force is no longer exerted. In various cases, the bearings may be spherical, cubic, cylindrical, and/or include gear elements that interact with one or more gear elements of the grooves. In some cases, the bearings cause the moveable body or bar element to translate vertically as well as move laterally, though in other cases the bearings may only cause the moveable body or bar elements to move laterally.

In some embodiments, a body element may include one or more electrical coils coplanar with the body element. In various cases, the body element may also include one or more hard magnets positioned in the center of the electrical coil that are polarized to stabilize or destabilize centering of the body element with respect to another body element.

In various embodiments, a magnetic circuit may include a first bar element with a plurality of hard magnets and/or soft magnets and a second bar element with one or more electrical coils wrapped around the second bar element. In some cases, the electrical coil may include a first section wrapped in a first direction, a second section wrapped in a second direction opposing the first direction, and a middle section that transitions between the first direction and the second direction.

In one or more embodiments, an actuator may include a fixed body element, with first and second side soft magnets, that is moveably coupled to a moveable body element. Exertion of force may cause the moveable body element to move such that the moveable body element approaches and/or contacts the first or second soft side magnet. Such contact may result in a "tap," which may be provided to a user as a tactile output. Upon contact, the moveable body element may magnetically attach to the respective soft side magnet and may remain so after the force is no longer exerted until another force is exerted that detaches the moveable body element and causes it to move to approach the other soft side magnet.

In some embodiments, an actuator may include a first magnetic attraction element, a second magnetic attraction element, and a moveable member including a first hard magnet, a second hard magnet, and an electrical coil. Exertion of force may cause the moveable member to move such that the first hard magnet approaches and/or contacts the first magnetic attraction element or the second hard magnet approaches and/or contacts the second magnetic attraction element. Such contact may result in a "tap," which may be provided to a user as a tactile output. Upon contact, the respective hard magnet may magnetically attach to the respective magnetic attraction element and may remain so after the force is no longer exerted until another force is exerted that detaches the respective hard magnet and causes the moveable member to move such that the other hard magnet approaches the other magnetic attraction member. In some cases, the magnetic attraction elements may be hard magnets, though in other implementations the magnetic attraction elements may be soft magnets.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1A:
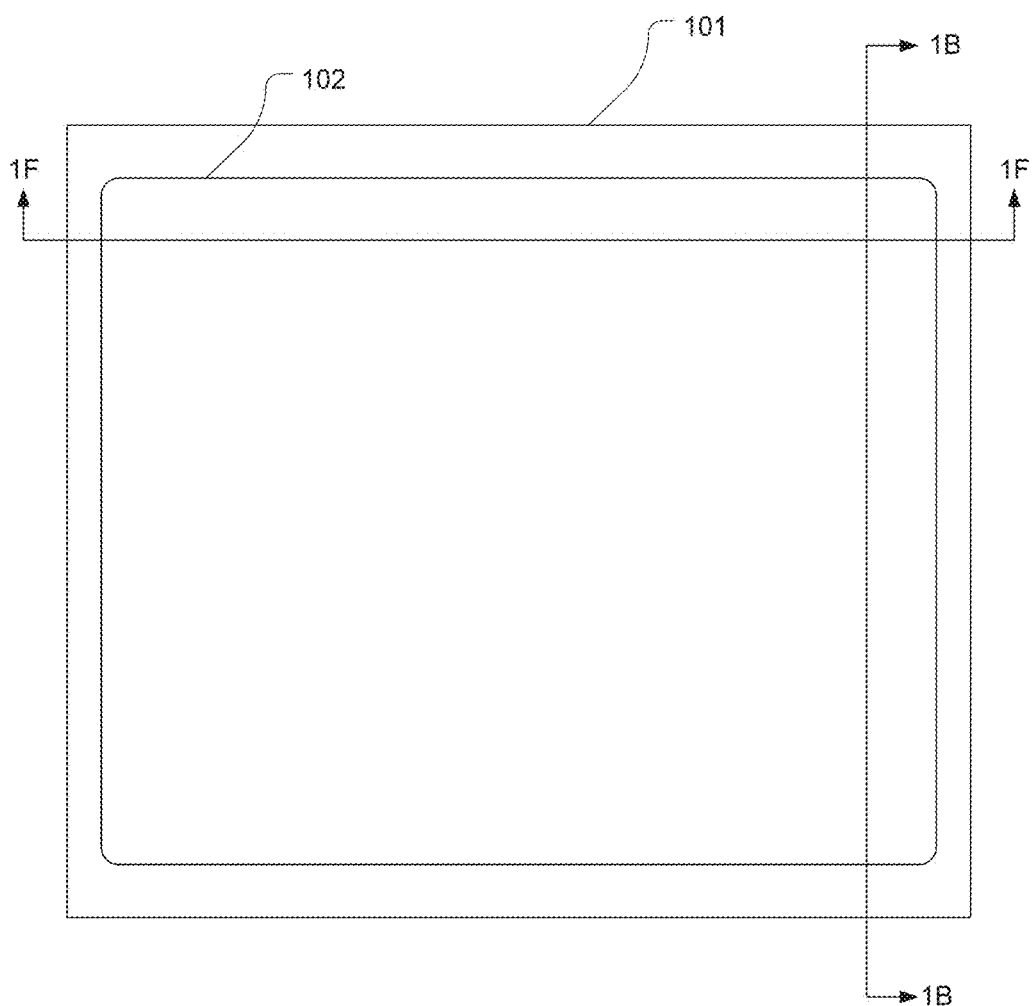
FIG. 1A is a top view illustrating a track pad incorporated into an electronic device.

The description that follows includes sample systems, methods, and computer program products that embody various elements of the present disclosure. However, it should be understood that the described disclosure may be practiced in a variety of forms in addition to those described herein.

In many magnetic actuators, a first body element and a second body element may be connected via one or more centering springs. When the first and second body elements move with respect to each other from an original position, the centering spring may exert a restorative force upon the first and second body elements. This restorative force may operate to bring the first and second body elements back to the original position so that the first and second body elements are positioned for subsequent movement.

The present disclosure discloses magnetic actuators and circuits. In various embodiments, a magnetic actuator or circuit may include a first element that is moveably coupled to a second element via one or more bearings positioned between one or more grooves. In some cases the grooves may be curved. The bearings and the curves may exert a restorative force to return the first and second elements to an original position after movement. In various cases, the bearings may be spherical, cubic, cylindrical, and/or include gear elements that interact with one or more gear elements of the grooves.

In some embodiments, a second element may include one or more electrical coils that are coplanar with a surface of the second element. In various cases, the second element may also include one or more hard magnets positioned in the center of the electrical coil that are polarized to stabilize or destabilize centering of the second element with respect to a first element.

In various embodiments, a magnetic circuit may include a second element with one or more electrical coils wrapped around the second element. In some cases, the electrical coil may include a first section wrapped in a first direction, a second section wrapped in a second direction opposing the first direction, and a middle section that transitions between the first direction and the second direction.

In one or more embodiments, an actuator may include a first element with first and second side soft magnets that is moveably coupled to a second element. Exertion of force may cause the second element to move such that the second body element approaches and/or contacts the first or second soft side magnet. Such contact may result in a "tap," which may be provided to a user as a tactile output. Upon contact, the second element may magnetically attach to the respective soft side magnet and may remain so after the force is no longer exerted until another force is exerted that detaches the second element and causes it to move to approach the other soft side magnet.

In other embodiments, an actuator may include a first magnetic attraction element, a second magnetic attraction element, and a moveable member including a first hard magnet, a second hard magnet, and an electrical coil. Exertion of force may cause the moveable member to move such that the first hard magnet approaches and/or contacts the first magnetic attraction element or the second hard magnet approaches and/or contacts the second magnetic attraction element. Upon contact, the respective hard magnet may magnetically attach to the respective magnetic attraction element and may remain so after the force is no longer exerted until another force is exerted that detaches the respective hard magnet and causes the moveable member to move such that the other hard magnet approaches the other magnetic attraction member.

FIG. 1A is a top view illustrating a track pad 102 incorporated into an electronic device 101. The electronic device may be any electronic device that includes a track pad such as a desktop computer, a laptop computer, a wearable device, a smart phone, a digital media player, a mobile computing device, a tablet computing device, and so on.

Figure 1B:
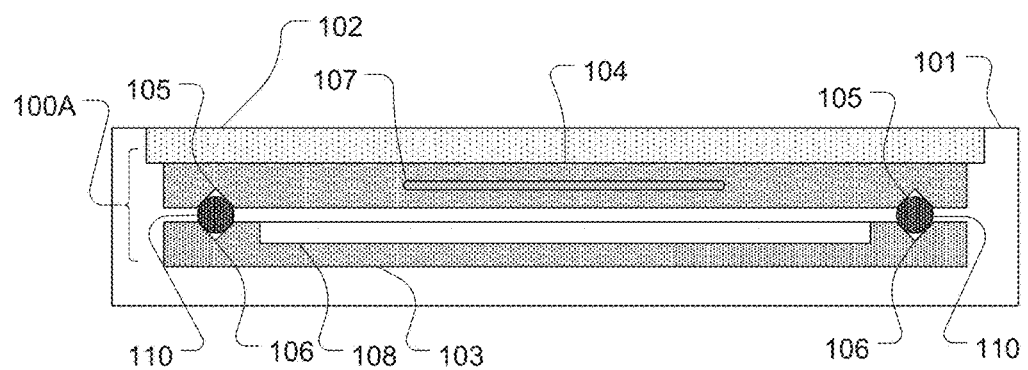
FIG. 1B is a cross sectional side view of the electronic device taken along line 1B in FIG. 1A including a first embodiment of a magnetic actuator.

FIG. 1B is a cross sectional side view of the electronic device 101 taken along the line 1B in FIG. 1A. As illustrated, a first embodiment of a magnetic actuator 100A is coupled to the track pad 102.

Although the magnetic actuator is illustrated and described herein as coupled to the track pad of the electronic device, it is understood that this is an example. In various implementations, the magnetic actuator may be utilized in a variety of different ways in a variety of different electronic devices. For example, such a magnetic actuator may be coupled to a housing (such as the housing of a tablet computer, mouse, and so on), one or more selection elements (such as one or more keys of a keyboard, buttons of a mouse, touch pads of a tablet computing device, and so on), a wearable device such as a watch, glasses, and so on.

As illustrated, the magnetic actuator may include a fixed body element 104, a number of bearings 110 (which may be spherical), and a moveable body element 103. The fixed body element may include an electrical coil 107 (which may be coplanar with a surface of the fixed body element) and a number of first grooves 105. The moveable body element may include a first hard magnet (materials that are permanently magnetic such as rare-earth magnets) 108, a second hard magnet element 109 (see FIGS. 1D and 1E) (which may have an opposite polarity than the first hard magnet facing a surface of the moveable body element), and a number of second grooves 106. The moveable body element may be attracted to the fixed body element via the first hard magnet and/or the second hard magnet element. The moveable body element may be separated from the fixed body element by the bearings positioned in the first and second grooves.

Figure 1C:
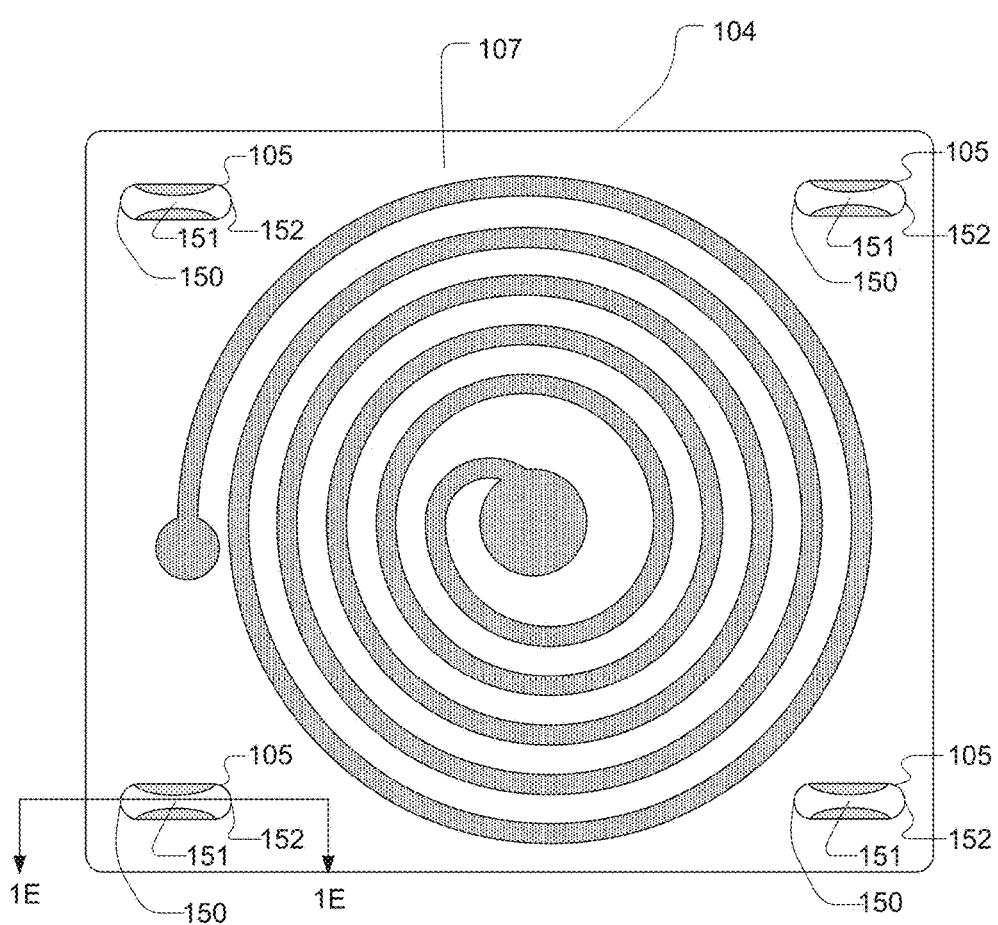
FIG. 1C is a bottom view of the fixed body element of FIG. 1B.

FIG. 1C is a bottom view of the fixed body element 104. As illustrated, the first grooves may be curved such that the fixed body element grooves are deeper at a center portion 150 than at either edge portion 151 or 152.

Figure 1D:
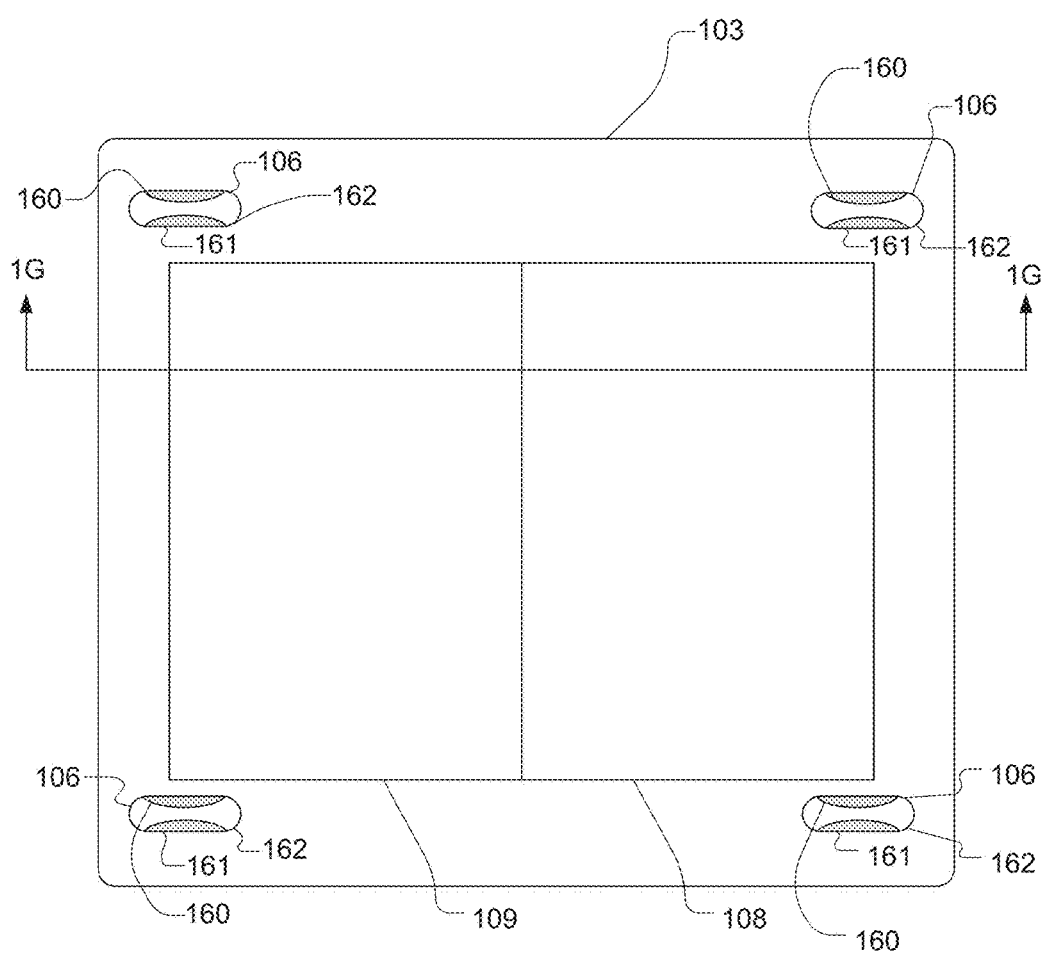
FIG. 1D is a top view of the moveable body element of FIG. 1B.

FIG. 1D is a top view of the moveable body element 103. As illustrated, the second grooves 106 may be curved such that the moveable body element grooves are deeper at a center portion 160 than at either edge portion 161 or 162.

Application of electrical current to the electrical coil 107 may cause the electrical coil to generate a magnetic field. The magnetic field has a magnetic flux. The magnetic flux may exert a force upon any magnetic material (i.e., the first hard magnet 108 and the second hard magnet 109) within the magnetic field. The vector of the force may vary with the magnetic flux, which may vary according to the position of the magnetic material within the field. This force may cause the moveable body element 103 to move laterally with respect to the fixed body element 104. This movement may cause one or more vibrations, which may be provided to a user as tactile output or feedback. An example of the flow of the magnetic flux 170 can be seen in FIG. 1F.

Thus, returning to FIGS. 1B-1D, when the moveable body element 103 moves laterally with respect to the fixed body element 104 due to the lateral force, the bearing 110 may move from the deeper center portions 150 and 160 to the narrower edge portions 151, 161 or 152, 162 (depending on the direction of motion). This may force the moveable body element further away vertically from the fixed body element. When the lateral force ceases, gravity and/or other forces may then cause the bearing to move from the narrower edge portions 151, 161 or 152, 162 to the deeper center portions 150 and 160. This may allow the moveable body element to move back vertically closer to the fixed body element.

As such, the bearings 110 and the grooves 105 and 106 may interact to exert a restorative force on the moveable body element after movement. This restorative force may operate to return the moveable body element to an original position with respect to the fixed body element after the lateral movement.

Figure 1E:
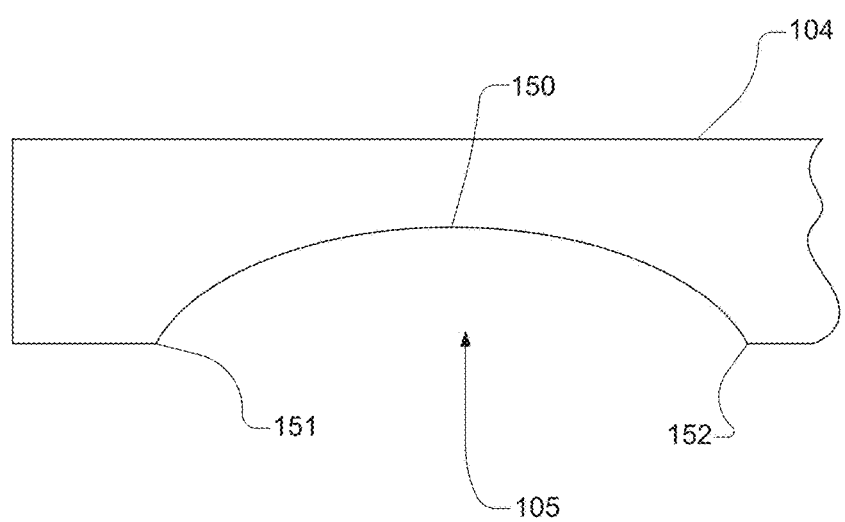
FIG. 1E is a close up side view of a first groove of the fixed body element of FIG. 1C taken along line 1E in FIG. 1C.

FIG. 1E is a close-up side view of a first groove of the fixed body element 104 of FIG. 1C. As illustrated, the center portion 150 is deeper than the edge portions 151 or 152.

With reference again to FIG. 1C, in addition to the center portion 150 of the first grooves 105 being deeper than the edge portions 151 and 152, the grooves may be curved such that the inside portion of the grooves are deeper than their outside portions. As such, the first grooves may be v-shaped cross-sectionally, u-shaped, or similarly shaped. This may cause the sides of the bearings 110 to contact outside portions of the first grooves at two points as opposed to the bottom of the bearings contacting the inside portion of the first grooves (e.g., the bottom of the channel formed by the first grooves). With reference again to FIG. 1D, the second grooves 106 may be similarly curved.

Additionally, although the bearings 110 are illustrated and described above as spherical and the first and second grooves 105 and 106 are shown as curved cross sectionally to correspond to the bearings, it is understood that this is an example. In various implementations, the bearings may be cylindrical and include a plurality of gear elements that are configured to interact with gear elements defined in the first and second grooves. Such an implementation may prevent slippage between the bearings and the first grooves and the second grooves. Such an implementation is illustrated in FIG. 1H, which illustrates gear elements 192 defined in a first groove 105 interacting with gear elements 191 of a cylindrical bearing 110.

Figure 1F:
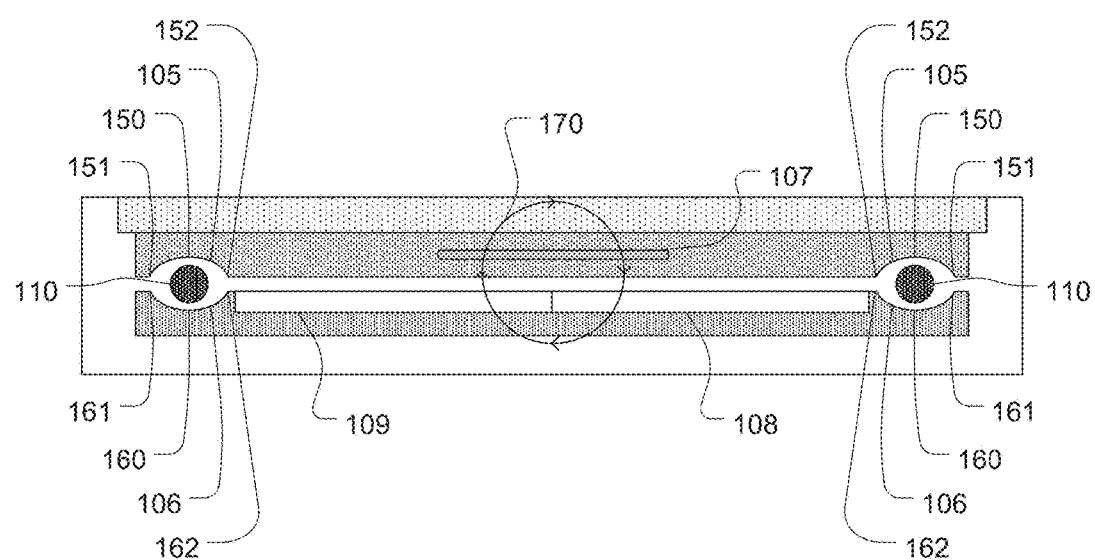
FIG. 1F is a cross sectional side view of the electronic device taken along line 1F in FIG. 1A illustrating an example flow of magnetic flux.

FIG. 1F is a cross sectional side view of the electronic device taken along line 1F in FIG. 1A, illustrating an example flow of magnetic flux 170 in response to a specific electrical current applied to the electrical coil 107.

Although the magnetic actuator 100A is illustrated and described above as including four bearings 110, four first grooves 105, and four second grooves 106, it is understood that this is an example. In various implementations, the magnetic actuator may include any number of bearings and/or grooves (such as one, three, or fifteen).

Figure 1G:
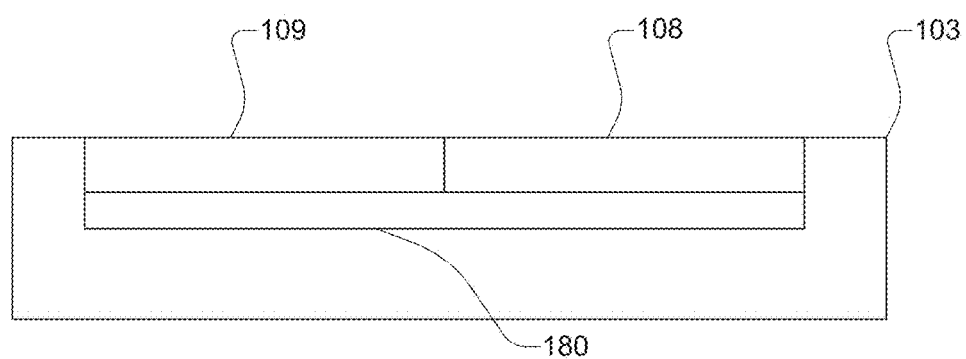
FIG. 1G illustrates a cross sectional side view of an alternative embodiment of the moveable body element of FIG. 1B taken along line 1G of FIG. 1D.
Figure 1H:
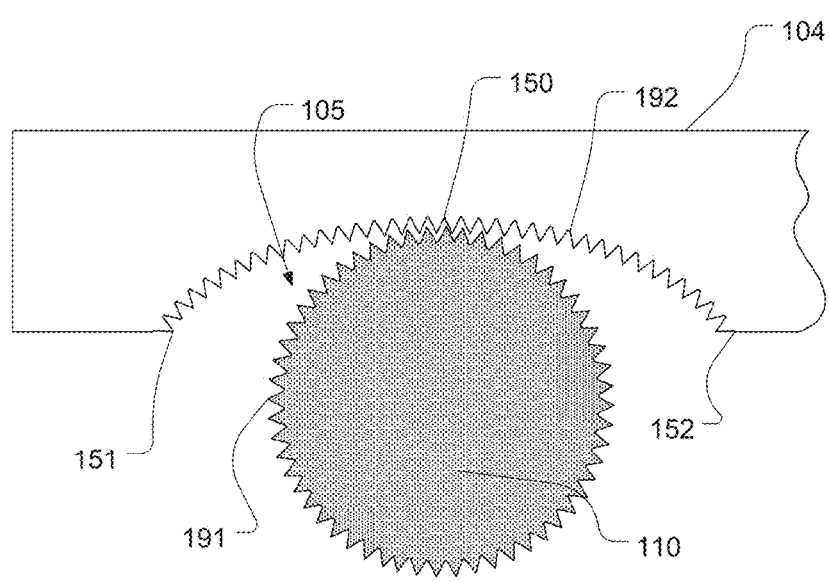
FIG. 1H is a close up side view of an alternative embodiment of the first groove of the fixed body element of FIG. 1E.

FIG. 1G illustrates a cross sectional side view of an alternative embodiment of the moveable body element 103 of FIG. 1B, taken along line 1G of FIG. 1D. As illustrated, at least one soft magnet 180 (a material that is not permanently magnetic but can become magnetic in response to the proximity of a magnetic force) may be positioned beneath the first hard magnet 108 and/or the second hard magnet 109 such that the first hard magnet and/or the second hard magnet are positioned between the soft magnet and the fixed body element 104. In some implementations, the soft magnet may be composed at least partially of a ferrous metal such as steel.

Figure 1I:
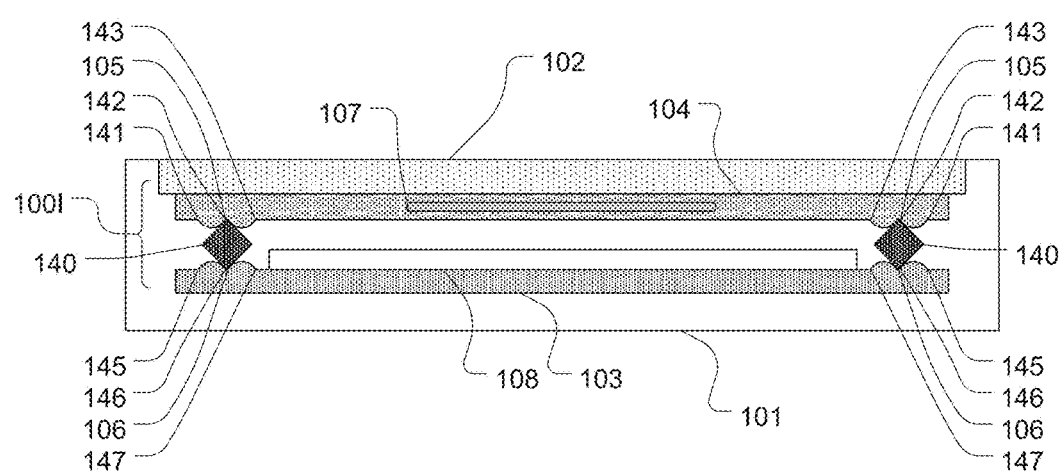
FIG. 1I is a cross sectional side view of the electronic device taken along line 1B in FIG. 1A including a second embodiment of a magnetic actuator.

FIG. 1I is a cross sectional side view of the electronic device taken along line 1B in FIG. 1A, including a second embodiment of a magnetic actuator 100I. As illustrated, in this embodiment the bearings 140 are cubes. Further, the first grooves 105 include curved areas 141 and 143 that curve inward toward center point 142. Similarly, the second grooves 106 include curved areas 145 and 147 that curve inward toward center point 146.

As such, when the moveable body element 103 moves laterally with respect to the fixed body element 104 due to the application of force, the cube bearings may roll along the corresponding curved areas. When the force ceases, gravity and/or other forces may then cause the cube bearings to roll back along the corresponding curved areas. This may provide a restorative force that may operate to return the moveable body element to an original position with respect to the fixed body element after movement.

The relationship between the dimensions of the cube and the dimensions of the curved areas 141, 143, 145, and/or 147 may determine whether or not the cube bearings 140 move the moveable element 103 in a purely lateral direction or whether the cube bearings force the moveable body element to translate vertically as well as laterally.

Figure 1J:
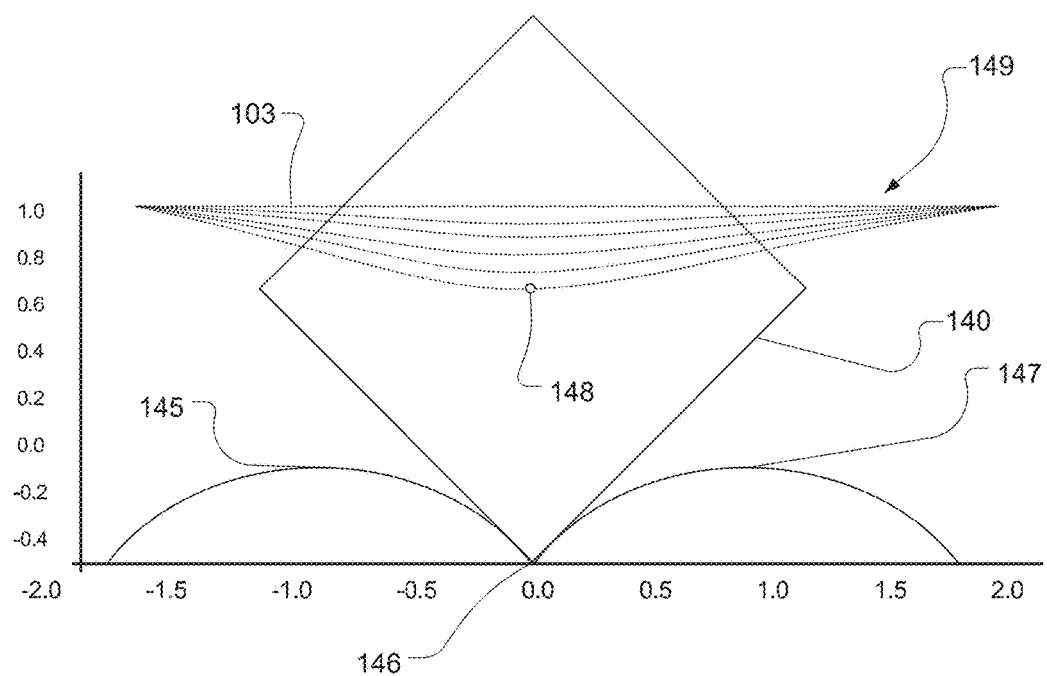
FIG. 1J is a close up view of a bearing and a second groove of FIG. 1I.

FIG. 1J is a close up view of a bearing 140 and a second groove 106 of FIG. 1I. The lines 149 indicate the movement of the moveable element 103 that may result based on a center point 148 of the cube bearings. Given the dimensions of the cube bearing illustrated, the center point corresponds to the lowest line 149, which is curved to indicate that the moveable body element would translate vertically during lateral movement. However, if the cube bearing was large enough that the center point corresponded to the top line 149, the moveable body element would only move laterally and would not translate vertically.

Although the moveable body element 103 has been illustrated and described above as moveable with respect to the fixed body element 104, it is understood that this is an example. In various implementations, the body element 104 may be moveable with respect to a fixed body element 103.

Figure 2A:
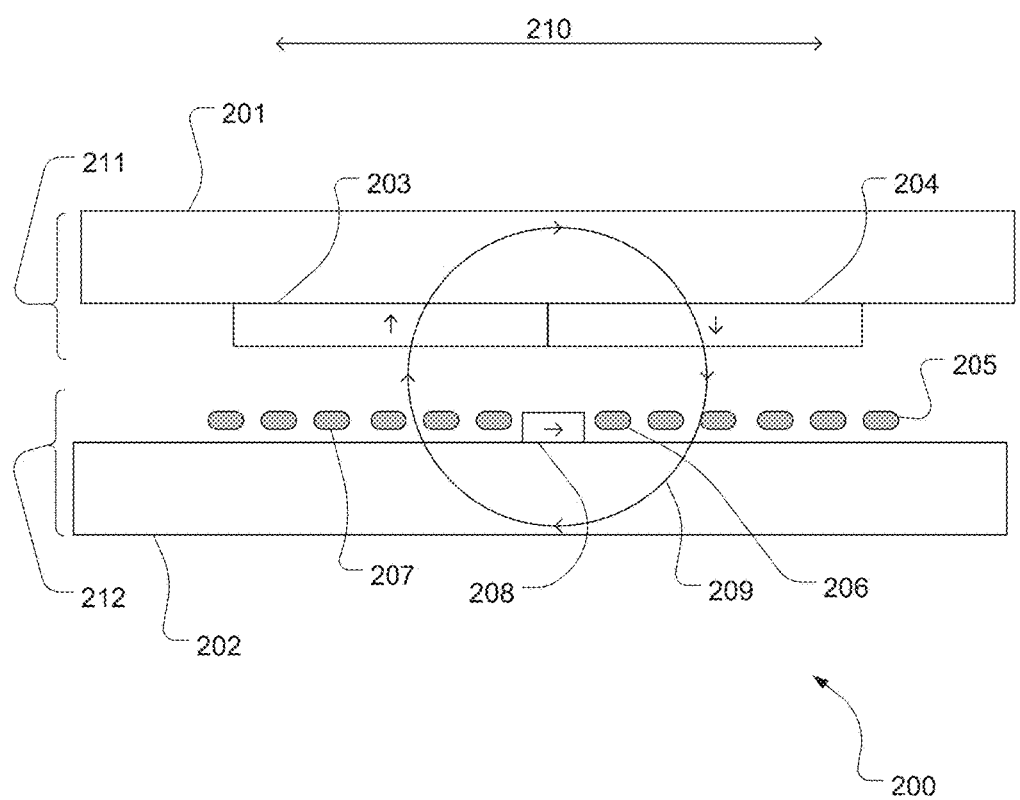
FIG. 2A is a cross sectional side view of a first implementation of a third embodiment of a magnetic actuator.

FIG. 2A is a cross sectional side view of a first implementation of a third embodiment of a magnetic actuator 200. In some implementations, such a magnetic actuator may be coupled to a device such as the track pad 102 of FIG. 1A.

Returning to FIG. 2A, as illustrated, the magnetic actuator 200 may include a first body element 211 that is moveably coupled to a second body element 212 such that the second body element is capable of lateral movement with respect to the first body element. The first body element may include a soft magnet 201, a first hard magnet 203, and a second hard magnet 204 (which may have an opposite polarity than the first hard magnet facing a surface of the first body element). The second body element may include an electrical coil 205 wound in a circular arrangement to have a first side 206, a second side 207, and a gap in the center. The second body element may also include a center hard magnet 208 positioned in the gap in the center of the electrical coil and a second soft magnet element 202 positioned underneath the electrical coil.

In response to application of an electrical current, the first and second sides of the electrical coil 206 and 207 may generate a magnetic field. The magnetic field has a magnetic flux 209. The magnetic flux may exert a force upon any magnetic material (i.e., the first hard magnet 203 and the second hard magnet 204) within the magnetic field. The vector of the force may vary with the magnetic flux, which may vary according to the position of the magnetic material within the field. This force may cause the second body element 212 to move laterally with respect to the first body element 211. This movement may cause one or more vibrations, which may be provided to a user as tactile output or feedback.

In this first implementation, the center hard magnet 208 may be polarized to oppose the direction of the magnetic flux 209. This opposition may destabilize centering of the first body element 211 with respect to the second body element 212 because the polarities of the sides of the center hard magnet 208 repel the respective polarities of the undersides of the first and second hard magnets 203 and 204. Instead, as a result of the opposition and repulsion, the second body element may be more stable when offset from center in either lateral direction with respect to the first body element than when centered with respect to the first body element. In implementations where the second body element has an original position centered with respect to the first body element, this may cause resistance to the second moveable body element returning to the original centered position with respect to the first moveable body element after the lateral movement 210.

In other implementations, the second body element 212 may have an original position that is offset with respect to the first body element 211 and that may be disrupted by the lateral movement 210 of the second body element. In such implementations, the opposition of the center hard magnet 208 to the direction of the magnetic flux 209 may provide a restorative force after the lateral movement (caused by the repulsion of the sides of the center hard magnet 208 that the respective polarities of the undersides of the first and second hard magnets 203 and 204) that acts to return the second body element to the original offset position with respect to the first body element after the lateral movement of the second body element.

The second body element 212 may be moveably coupled to the first body element 211 utilizing a variety of different mechanisms (not shown). For example, in some implementations the second body element may be suspended from the first body element, such as by wire or string. In other implementations, one or more springs, magnetic forces, and so on may moveably couple the second body element to the first body element.

Figure 2B:
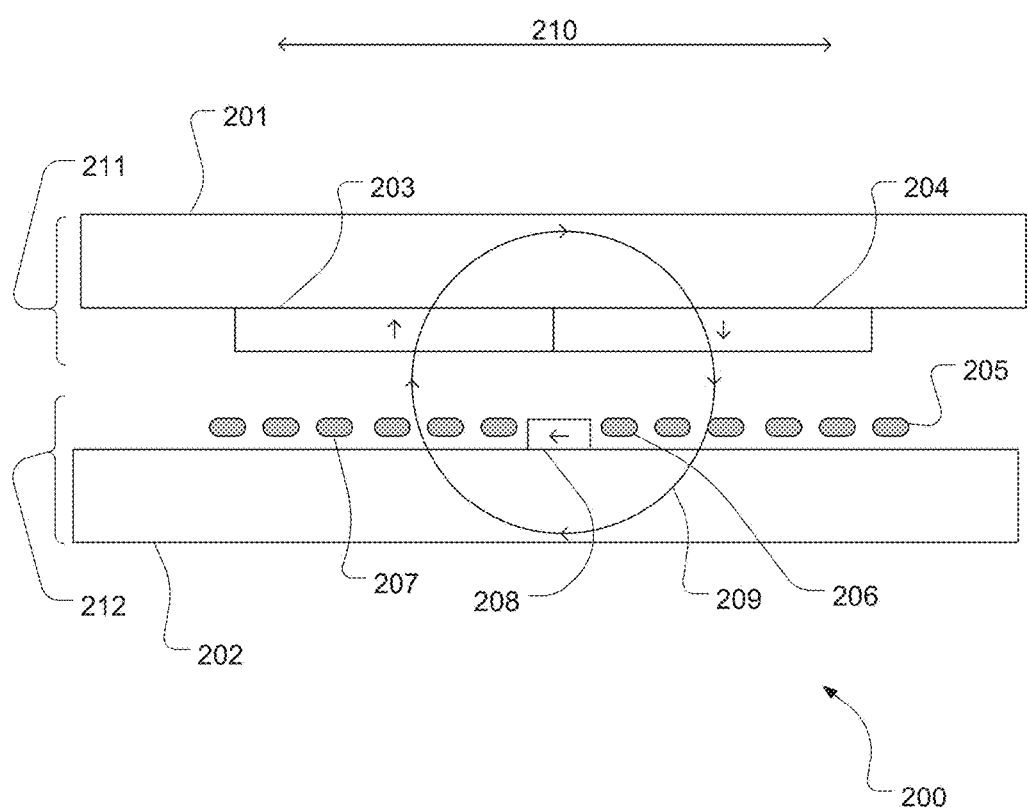
FIG. 2B is a cross sectional side view of a second implementation of the magnetic actuator of FIG. 2A.

FIG. 2B is a cross sectional side view of a second implementation of the magnetic actuator of FIG. 2A. In this second implementation, the center hard magnet 208 may be polarized to complement the direction of the magnetic flux 209. This complementing force may exert a restorative force on the first moveable body element and/or the second moveable body element because the polarities of the sides of the center hard magnet 208 attract the respective polarities of the undersides of the first and second hard magnets 203 and 204. Such restorative force may act to return the second body element 212 to an original position with respect to the first body element 211 after the lateral movement 210 of the second body element.

Although the second body element 212 has been illustrated and described above as moveable with respect to the first body element 211, it is understood that this is an example. In various implementations, the first body element may be moveable with respect to the second body element.

Figure 3A:
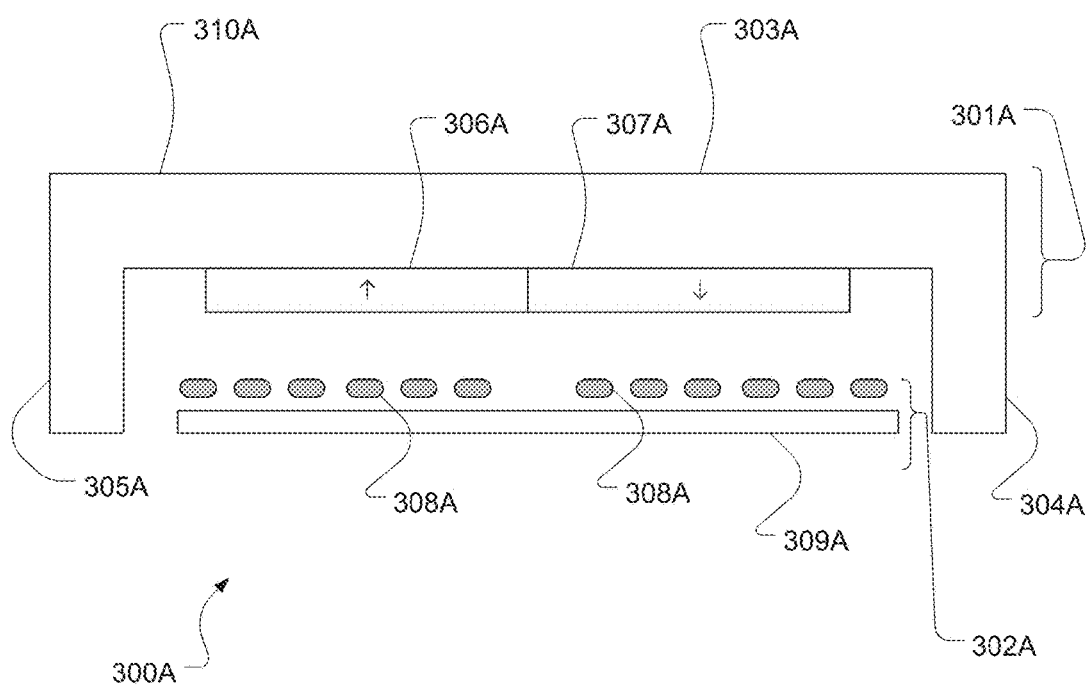
FIG. 3A is a cross sectional side view of a first implementation of a fourth embodiment of a magnetic actuator.

FIG. 3A is a cross sectional side view of a first implementation of a fourth embodiment of a magnetic actuator 300A. In some implementations, such a magnetic actuator may be coupled to a device such as the track pad 102 of FIG. 1A.

Returning to FIG. 3A, as illustrated, the magnetic actuator 300A may include a moveable body element 302A that is moveably coupled (such as laterally moveably coupled) to a fixed body element 301A. The fixed body element may include a first hard magnet 306A, a second hard magnet 307A, and a soft magnet 303A. The soft magnet may include a top structure 310A, a first side soft magnet 304A, and a second side soft magnet 305A. The moveable body element may include a base element 309A (which may be at least one soft magnet) and an electrical coil 308A.

Although the fixed body element 301A is illustrated and described as incorporating the top structure 310A, the first side soft magnet 304A, and the second side soft magnet 305A into a single soft magnet 303A, it is understood that this is an example. In other implementations the first side soft magnet, the second side soft magnet, and/or the top structure may be formed of separate soft magnets. Additionally, in various implementations the top structure may not be a soft magnet.

In response to application of an electrical current, the electrical coil 308A may generate a magnetic field. The magnetic field has a magnetic flux. The magnetic flux may exert a force upon any magnetic material (i.e., the first hard magnet 306A and the second hard magnet 307A) within the magnetic field. The vector of the force may vary with the magnetic flux, which may vary according to the position of the magnetic material within the field. This force may cause the moveable body element 302A to approach and/or contact either the first side soft magnet 304A or the second side soft magnet 305A. Such approaches and/or contacts may result in one or more vibrations or taps which may be provided to a user as haptic output or feedback.

When the second moveable body element 302A contacts the first side soft magnet 304A, the second moveable body element may magnetically attach to the first side soft magnet. Subsequently, the second moveable body element may remain magnetically attached to the first side soft magnet even after the electrical current that resulted in the movement of the second moveable body element is no longer applied to the electrical coil 308A. A similar effect may occur when the second moveable body element contacts the second side soft magnet 305A.

Figure 3B:
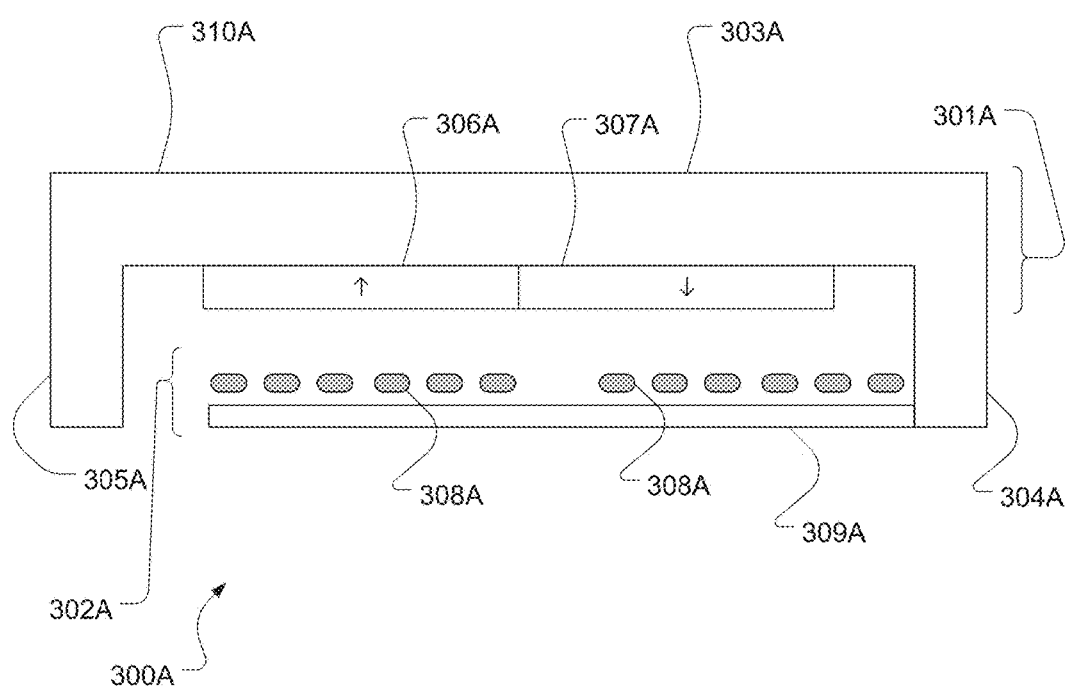
FIG. 3B illustrates the magnetic actuator of FIG. 3A after the application of a first electrical current to an electrical coil of the magnetic actuator.

FIG. 3B illustrates the magnetic actuator 300A of FIG. 3A after the application of a first electrical current to the electrical coil 308A, resulting in a lateral force being applied to the second moveable body element 302A. As illustrated, the second moveable body element approaches, contacts, and magnetically attaches to the first side soft magnet 304A. This contact may result in a "tap" which may be provided to a user as haptic output or feedback.

The second moveable body element 302A may remain magnetically attached to the first side soft magnet 304A even after the first electrical current is no longer applied to the electrical coil 308A. The second moveable body element may remain magnetically attached to the first side soft magnet until a second electrical current is applied to the electrical coil.

Figure 3C:
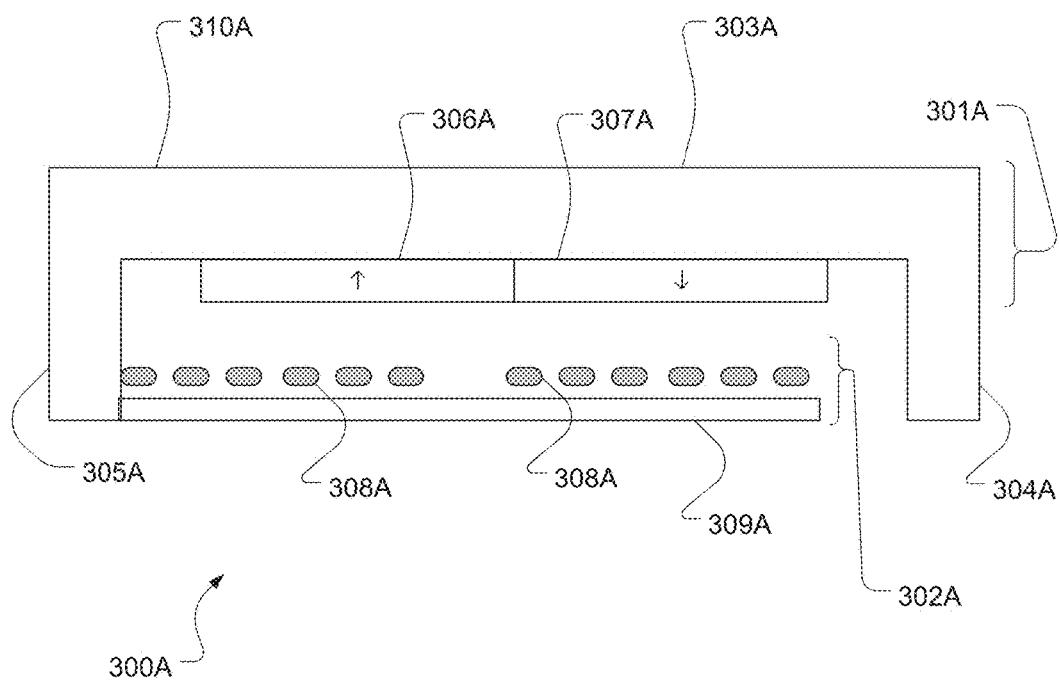
FIG. 3C illustrates the magnetic actuator of FIG. 3B after the application of a second electrical current to the electrical coil of the magnetic actuator.

FIG. 3C illustrates the magnetic actuator 300A of FIG. 3B after the application of the second electrical current to the electrical coil 308A, resulting in a lateral force (opposite to the lateral force illustrated in FIG. 3B) being applied to the second moveable body element 302A. As illustrated, the second moveable body element approaches, contacts, and magnetically attaches to the second side soft magnet 305A.

Although the moveable body element 302A has been illustrated and described above as moveable with respect to the fixed body element 301A, it is understood that this is an example. In various implementations, the body element 301A may be moveable with respect to a fixed body element 302A.

Figure 3D:
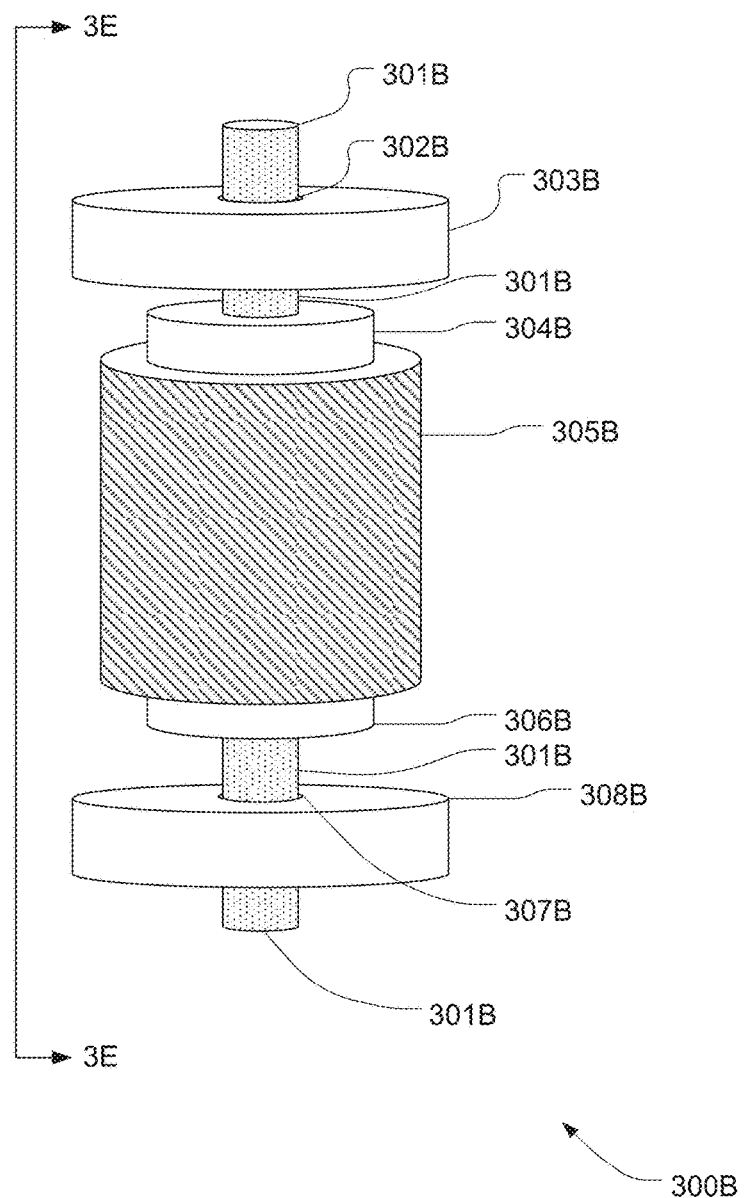
FIG. 3D is a front plan view of a second implementation of the fourth embodiment of a magnetic actuator.

FIG. 3D is a front plan view of a second implementation of the fourth embodiment of a magnetic actuator 300B. In some implementations, such a magnetic actuator may be coupled to a device such as the track pad 102 of FIG. 1A.

Returning to FIG. 3D, as illustrated, the magnetic actuator 300B may include a first magnetic attraction element 303B, a second magnetic attraction element 308B, and a moveable member 301B. The first magnetic attraction element may include a first aperture 302B, the second magnetic attraction element may include a second aperture 307B, and the moveable member may be configured to move by passing and/or extending through the first aperture and/or the second aperture. The moveable member may be a shaft and may include a first hard magnet 304B, a second hard magnet 306B, and at least one electrical coil 305B that is at least partially positioned or wrapped around the first hard magnet and/or the second hard magnet.

Figure 3E:
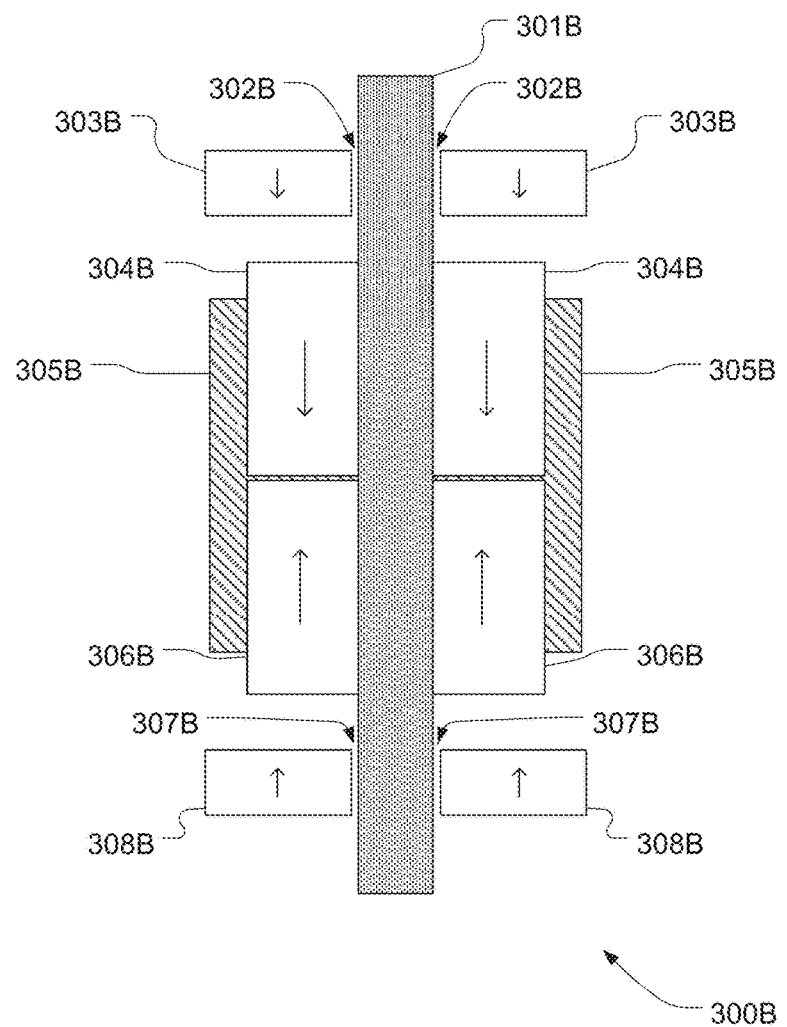
FIG. 3E is a cross sectional view of the magnetic actuator of FIG. 3D taken along line 3E in FIG. 3D.

FIG. 3E is a cross sectional view of the magnetic actuator 300B taken along line 3E in FIG. 3D. As illustrated, the first magnetic attraction element 303B and the second magnetic attraction element 308B may be hard magnets that are polarized towards each other. However, it is understood that this is an example and in various implementations the first magnetic attraction element and the second magnetic attraction element may be soft magnets. Similarly, the first hard magnet 304B and the second hard magnet 306B may be polarized towards each other.

In response to application of an electrical current, the electrical coil 305B may generate a magnetic field. The magnetic field has a magnetic flux. The magnetic flux may exert a force upon any magnetic material (i.e., the first hard magnet 304B and the second hard magnet 306B) within the magnetic field. The vector of the force may vary with the magnetic flux, which may vary according to the position of the magnetic material within the field. This force may cause the moveable member 301B to move such that the first hard magnet 304B approaches and/or contacts the first magnetic attraction element 303B or the second hard magnet 306B approaches and/or contacts the second magnetic attraction element 308B. Such approaches and/or contacts may result in one or more vibrations or taps which may be provided to a user as haptic output or feedback.

When the first hard magnet 304B contacts the first magnetic attraction element 303B, the first hard magnet may magnetically attach to the first magnetic attraction element. Subsequently, the first hard magnet may remain magnetically attached to the first magnetic attraction element even after the force is no longer exerted upon the moveable member 301B. A similar effect may occur when the second hard magnet 306B contacts the second magnetic attraction element 308B.

Figure 3F:
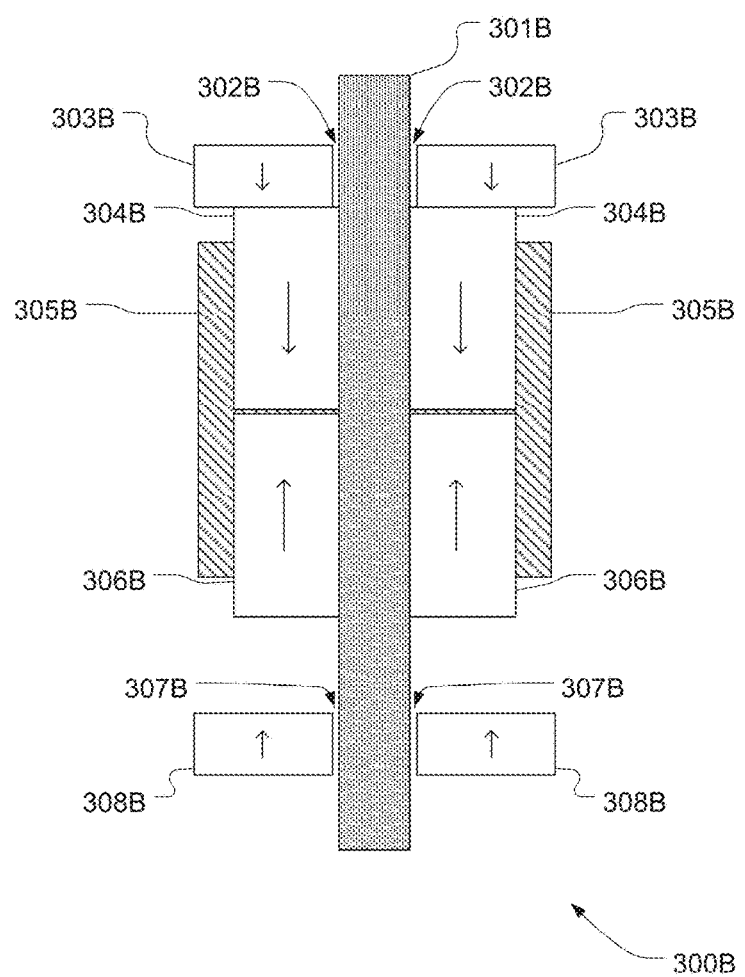
FIG. 3F illustrates the magnetic actuator of FIG. 3E after the application of a first electrical current to an electrical coil of the magnetic actuator.

FIG. 3F illustrates the magnetic actuator 300B of FIG. 3E after the application of a first electrical current to an electrical coil 305B, resulting in a force being applied to the moveable member 301B. As illustrated, the moveable member moves such that the first hard magnet 304B approaches, contacts, and magnetically attaches to the first magnetic attraction element 303B. This contact may result in a "tap" which may be provided to a user as haptic output or feedback.

The first hard magnet 304B may remain magnetically attached to the first magnetic attraction element 303B even after the first electrical current is no longer applied to the electrical coil 305B. The first hard magnet may remain magnetically attached to the first magnetic attraction element a second electrical current is applied to the electrical coil, resulting in a force being applied to the moveable member 301B (opposite to the force shown in FIG. 3F) such that the first hard magnet detaches from the first magnetic attraction element and the second hard magnet 306B approaches the second magnetic attraction element 308B.

Figure 3G:
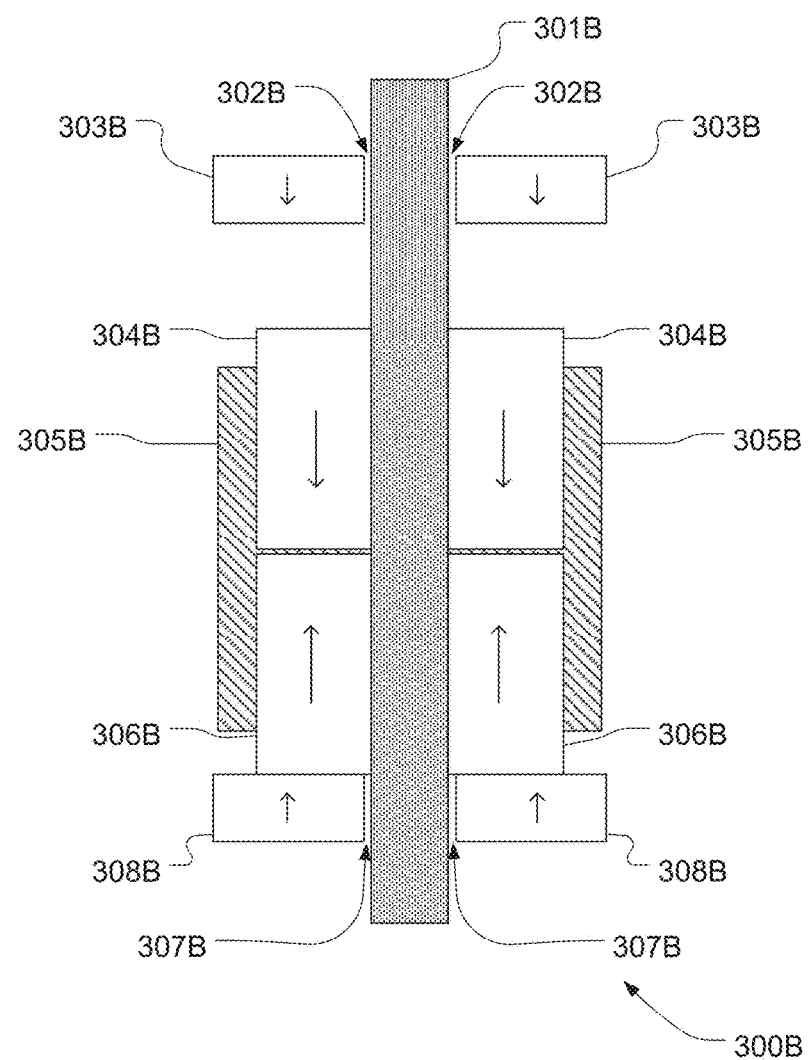
FIG. 3G illustrates the magnetic actuator of FIG. 3F after the application of a second electrical current to the electrical coil of the magnetic actuator.

FIG. 3G illustrates the magnetic actuator 300B of FIG. 3F after the application of a second electrical current to the electrical coil 305B. As illustrated, the second hard magnet 306B approaches, contacts, and magnetically attaches to the second magnetic attraction element 308B.

Figure 3H:
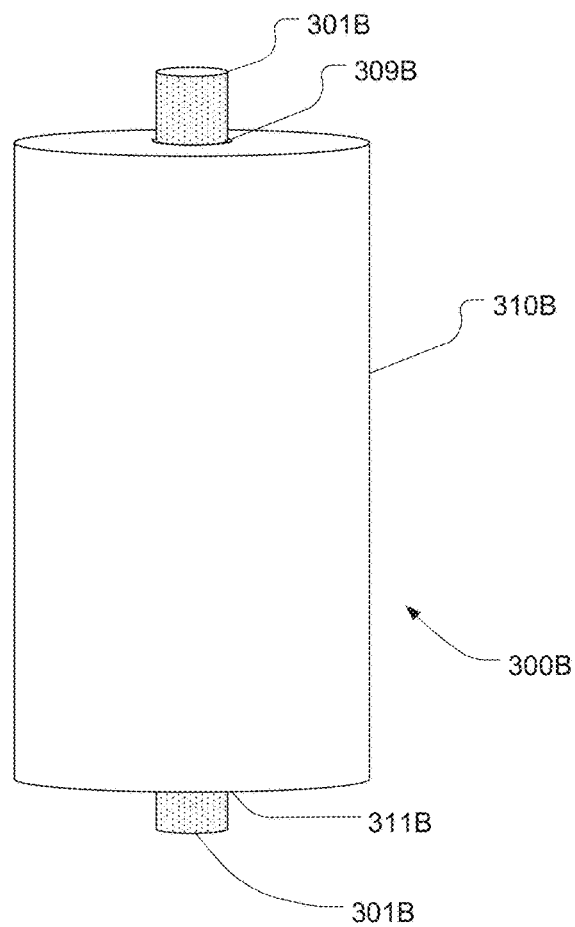
FIG. 3H illustrates the magnetic actuator of FIG. 3D with a housing surrounding parts of the magnetic actuator.

FIG. 3H illustrates the magnetic actuator of FIG. 3D with a housing 310B surrounding parts of the magnetic actuator. As illustrated, in some implementations, such a housing may surround the first hard magnet 304B, the second hard magnet 306B, the electrical coil 305B, the first magnetic attraction element 303B, the second magnetic attraction element 308B, and at least part of the moveable member 301B. As also illustrated, the housing may include a first housing aperture 309B and a second housing aperture 311B and the moveable member 301B may be configured to move by passing and/or extending through the first housing aperture and/or the second housing aperture.

Figure 4A:
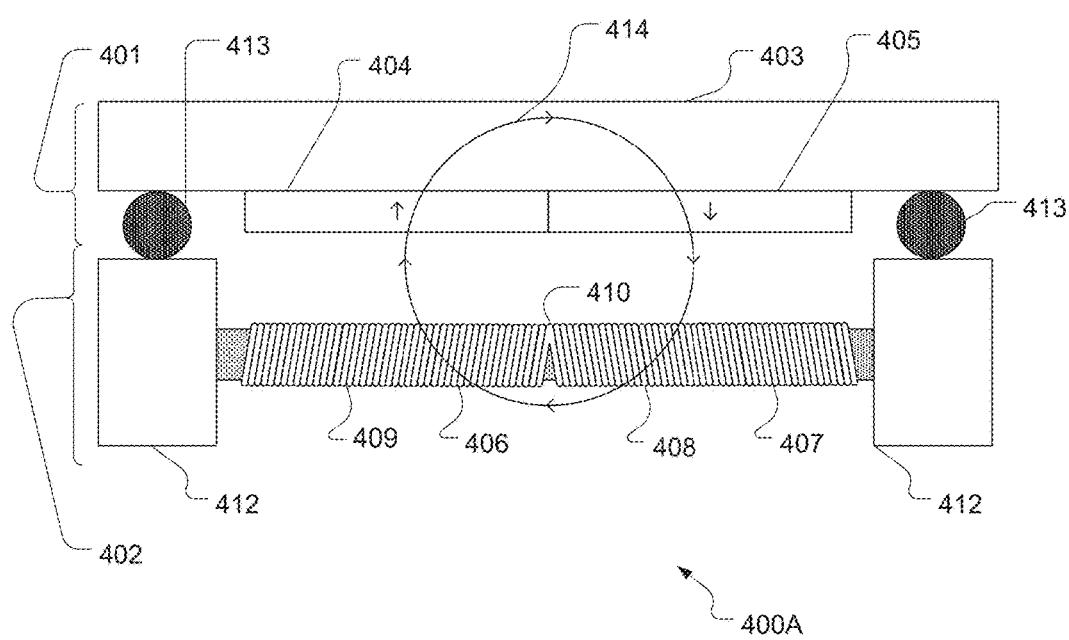
FIG. 4A is a front view of a first embodiment of a magnetic circuit.

FIG. 4A is a front view of a first embodiment of a magnetic circuit 400A. In some implementations, such a magnetic circuit may be a magnetic actuator. In various implementations, such a magnetic circuit may be coupled to a device such as the track pad 102 of FIG. 1A.

Returning to FIG. 4A, as illustrated, the magnetic circuit 400A may include a moveable bar element 401 that is moveably coupled to a fixed bar element 402. The moveable bar element may include a soft magnet 403, a first hard magnet 404, and a second hard magnet 405. The fixed bar element may include an electrical structure 407 (such as a wire, wire insulated in plastic and/or rubber, and/or other electrical coil structure) wound around a bar structure 406 of the fixed bar element.

As illustrated, the electrical coil structure 407 may have a first section 409 that is wound in a first direction around the bar structure 406 and a second section 408 that is wound in a second direction around the bar structure. The first direction may be opposite of the second direction. Further, the electrical coil structure may include a middle section 410 where the winding in the first direction changes to the second direction. In various cases, the middle section may be attached to the bar structure, such as utilizing adhesive.

In response to application of an electrical current, the electrical coil structure 407 may generate a magnetic field. The magnetic field has a magnetic flux 414. The magnetic flux may exert a force upon any magnetic material (i.e., the first hard magnet 404 and the second hard magnet 405) within the magnetic field. The vector of the force may vary with the magnetic flux, which may vary according to the position of the magnetic material within the field. This force may cause the moveable bar element 401 to move laterally with respect to the fixed bar element 402. Such movement may result in one or more vibrations which may be provided to a user as haptic output or feedback.

Figure 4B:
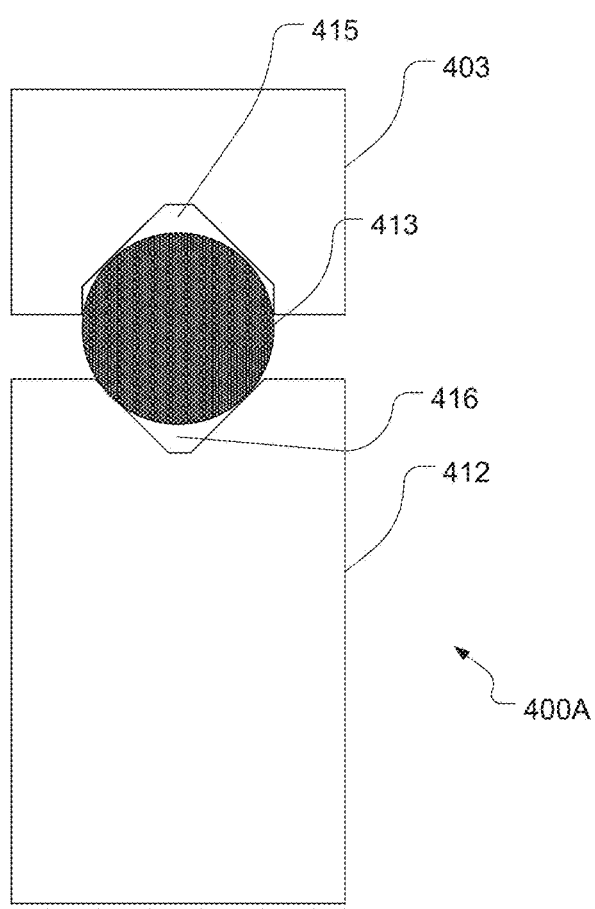
FIG. 4B is a side view of the magnetic circuit of FIG. 4A.

As illustrated, the moveable bar element 401 may be moveably coupled to portions 412 of the fixed bar element 402 via bearings 413. As illustrated in FIG. 4B, the bearings may be positioned between first grooves 415 and second grooves 416. Movement of the bearings along the first grooves and second grooves may enable the moveable bar element to move laterally with respect to the fixed bar element.

Although the magnetic circuit 400A is illustrated and described as utilizing the bearings 413 to moveably couple the moveable bar element 401 and the fixed bar element 402, it is understood that this is an example. In other implementations, springs or other moveable attachment mechanisms may be utilized to moveably attach the moveable bar element and the fixed bar element.

Although the moveable bar element 401 has been illustrated and described above as moveable with respect to the fixed bar element 402, it is understood that this is an example. In various implementations, the bar element 402 may be moveable with respect to a fixed bar element 401.

Figure 4C:
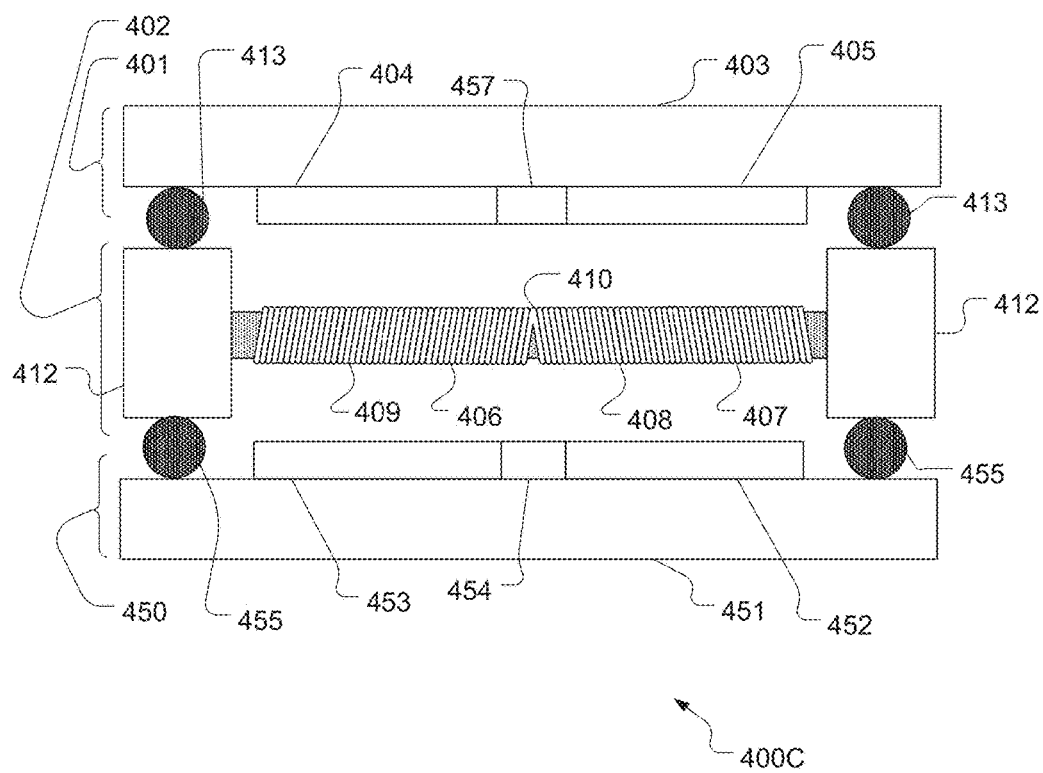
FIG. 4C is a front view of a second embodiment of a magnetic circuit.

FIG. 4C is a front view of a second embodiment of a magnetic circuit 400C. Contrasted with the first embodiment of the magnetic circuit 400A illustrated in FIGS. 4A and 4B, the magnetic circuit 400C may include an additional moveable bar element 450. The additional moveable bar element may be moveably coupled to an opposite side of the fixed bar element 402 from the moveable bar element 401. The additional moveable bar element may be moveably coupled to the fixed bar element via bearings 455.

Further contrasted with the magnetic circuit 400A illustrated in FIGS. 4A and 4B, the moveable bar element 401 of the magnetic circuit 400C may include a first mass adding element 457. The first mass adding element may be positioned between the first hard magnet 404 and the second hard magnet 405 and may function to contribute mass to movement of the first moveable bar element. In some cases, the first mass adding element may be formed from tungsten.

The additional moveable bar element 450 may include a soft magnet 451, a third hard magnet 453, and a fourth hard magnet 452. Additionally, the additional moveable bar element may include a second mass adding element 454. The second mass adding element may be positioned between the third hard magnet and the fourth hard magnet.

Figure 4D:
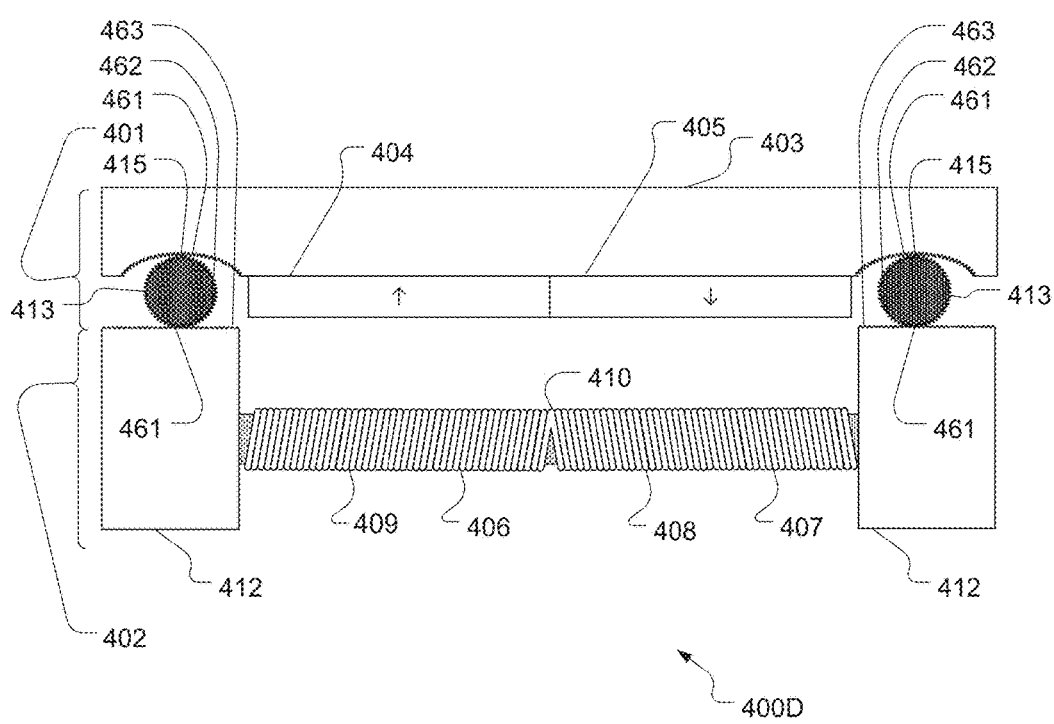
FIG. 4D is a front view of a third embodiment of a magnetic circuit.

FIG. 4D is a front view of a third embodiment of a magnetic circuit 400D. As contrasted with the first embodiment of the magnetic circuit 400A illustrated in FIGS. 4A and 4B, the first grooves 415 and/or the second grooves 416 of the magnetic circuit 400D may include gear elements 461. Additionally, the bearings 413 (which may be cylindrical) may include gear elements 462. Interaction between the gear elements of the bearings and the gear elements of the grooves may enable the moveable bar element to move laterally with respect to the fixed bar element. Such an implementation may prevent slippage between the bearings and the grooves.

Although the magnetic circuit 400D is illustrated and described as utilizing the gear elements 461, 462, and 463 in the same magnetic circuit as the particular electrical coil structure 407, it is understood that this is an example. In other implementations the gear elements 461, 462, and 463 may be utilized to moveably couple various different moveable elements without departing from the scope of the present disclosure. For example, in some implementations the gear elements 461, 462, and 463 may be utilized to moveably couple elements such as the fixed body element 104 and the moveable body element 103 of FIGS. 1B-1E.

Figure 4E:
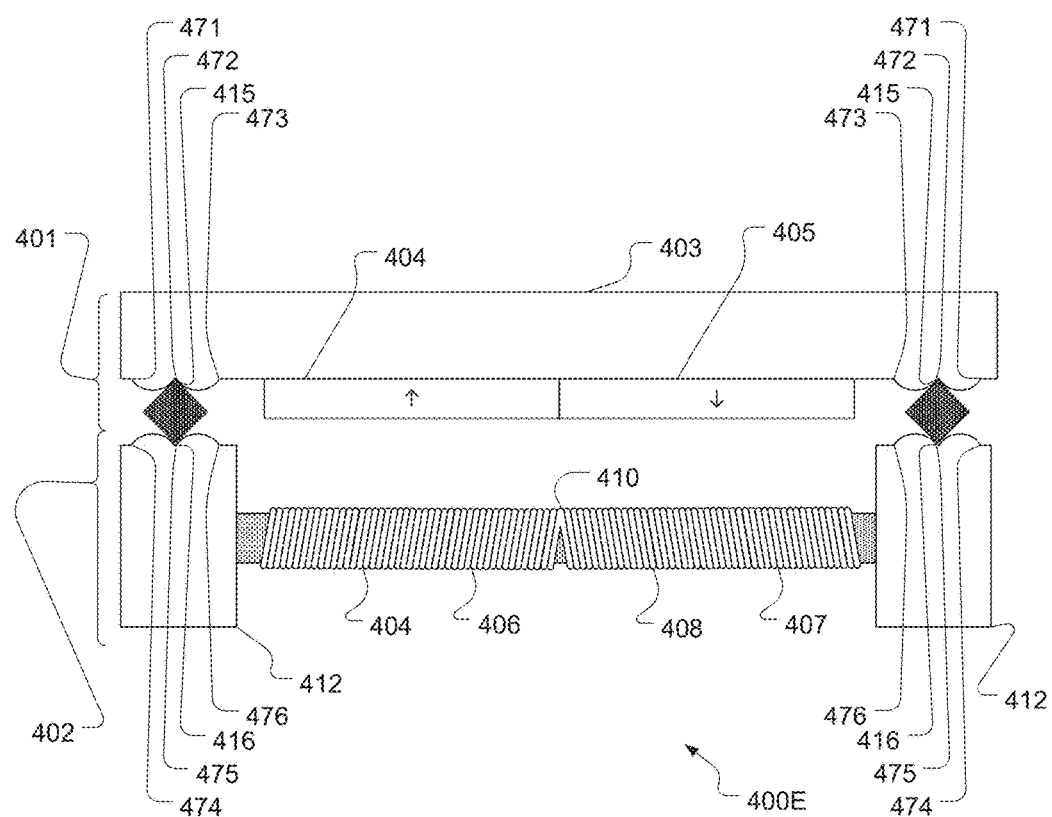
FIG. 4E is a front view of a fourth embodiment of a magnetic circuit.

FIG. 4E is a front view of a fourth embodiment of a magnetic circuit 400E. As contrasted with the first embodiment of the magnetic circuit 400A illustrated in FIGS. 4A and 4B, the bearings 413 may be cubes. Further, the first grooves 415 may include curved areas 471 and 473 that curve inward toward center point 472. The second grooves 416 may be similarly curved. As such, when the moveable bar element 401 moves laterally with respect to the fixed bar element 402 due to the application of electrical current to the electrical coil structure 407, the cube bearings may roll along the corresponding curved areas. When the lateral movement is ceased, gravity and/or other forces may then cause the cube bearings to roll back along the corresponding curved areas. This may provide a restorative force that may operate to return the moveable bar element to an original position with respect to the fixed bar element after the lateral force is ceased.

The relationship between the dimensions of the cube and the dimensions of the curved areas 471, 473, 474, and/or 476 may determine whether or not the cube bearings 413 move moveable bar element 401 in a purely lateral direction or whether the cube bearings force the moveable body element to translate vertically as well as laterally.

As discussed above and illustrated in the accompanying figures, the present disclosure discloses magnetic actuators and circuits. In various embodiments, a magnetic actuator or circuit may include a moveable element that is moveably coupled to a fixed element via one or more bearings positioned between one or more grooves. In some cases the grooves may be curved. The bearings and the curves may exert a restorative force to return the first and second elements to an original position after movement. In various cases, the bearings may be spherical, cube, cylindrical, and/or include gear elements that interact with one or more gear elements of the grooves.

In some embodiments, a body element may include one or more electrical coils coplanar with a surface of the body element. In various cases, the body element may also include one or more hard magnets positioned in the center of the electrical coil that are polarized to stabilize or destabilize centering of the body element with respect to another element.

In various embodiments, a magnetic circuit may include a bar element with one or more electrical coils wrapped around the bar element. In some cases, the electrical coil may include a first section wrapped in a first direction, a second section wrapped in a second direction opposing the first direction, and a middle section that transitions between the first direction and the second direction.

In one or more embodiments, an actuator may include a fixed element with first and second side soft magnets that is moveably coupled to a moveable element. Exertion of force may cause the moveable element to move such that the moveable body element approaches and/or contacts the first or second soft side magnet. Such contact may result in a "tap," which may be provided to a user as a tactile output. Upon contact, the moveable element may magnetically attach to the respective soft side magnet and may remain so after the force is no longer exerted until another force is exerted that detaches the moveable element and causes it to move to approach the other soft side magnet.

In other embodiments, an actuator may include a first magnetic attraction element, a second magnetic attraction element, and a moveable member including a first hard magnet, a second hard magnet, and an electrical coil. Exertion of force may cause the moveable member to move such that the first hard magnet approaches and/or contacts the first magnetic attraction element or the second hard magnet approaches and/or contacts the second magnetic attraction element. Upon contact, the respective hard magnet may magnetically attach to the respective magnetic attraction element and may remain so after the force is no longer exerted until another force is exerted that detaches the respective hard magnet and causes the moveable member to move such that the other hard magnet approaches the other magnetic attraction member.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. An actuator, comprising:
   a fixed body element, including at least one first groove and at least one electrical coil;
   a moveable body element, including at least one second groove and a first and second hard magnet; and
   at least one bearing positioned between the at least one first groove and the at least one second groove that separates the fixed body element from the moveable body element;
   wherein the moveable body element is magnetically attracted toward the fixed body element, the first hard magnet has an opposite polarity facing a surface of the moveable body element than the second hard magnet, and at least one of the at least one first groove or the at least one second groove is curved such that applying a lateral force to the moveable body element causes the at least one bearing to force the moveable body element vertically away from the fixed body element.

2. The actuator of claim 1, wherein ceasing to apply the lateral force causes the at least one bearing to allow the moveable body element to move closer to the fixed body element.

3. The actuator of claim 1, wherein the at least one bearing is cylindrical.

4. The actuator of claim 1, wherein the moveable body element further includes at least one soft magnet positioned such that the first and second hard magnets are positioned between the at least one soft magnet and the fixed body element.

5. The actuator of claim 1, wherein the at least one bearing comprises a plurality of bearings, the at least one first groove comprises a plurality of first grooves, the at least one second groove comprises a plurality of second grooves, and each of the plurality of bearings is positioned between one of the plurality of first grooves and one of the plurality of second grooves.

6. An actuator, comprising:
   a first body element comprising a first hard magnet and a second hard magnet; and
   a second body element that is moveably coupled to the first body element and comprises at least one electrical coil and at least one center hard magnet positioned in a center of the at least one electrical coil;
   wherein the center hard magnet is polarized to either: oppose a direction of a magnetic flux; or correspond with the direction of the magnetic flux.

7. The actuator of claim 6, wherein the center hard magnet is polarized to correspond with the direction of the magnetic flux and exerts a restorative force to return the second body element to an original position with respect to the first body element after lateral movement.

8. The actuator of claim 7, wherein the center hard magnet is polarized to oppose the direction of the magnetic flux and resists return of the second body element to the original position.

9. The actuator of claim 6, wherein the center hard magnet is polarized to oppose the direction of the magnetic flux and destabilizes centering of the second body element with respect to the first body element.

10. The actuator of claim 6, wherein the first body element further comprises at least a first soft magnet element, and wherein at least one of the first hard magnet or the second hard magnet is positioned between the first soft magnet element and the second body element.

11. The actuator of claim 6, wherein the second body element further comprises at least a second soft magnet element, and wherein at least one of the at least one electrical coil or the at least one center hard magnet is positioned between the second soft magnet element and the first body element.

12. A magnetic circuit, comprising:
a moveable bar element that includes at least a first hard magnet and a second hard magnet; and
a fixed bar element that includes an electrical coil structure wound around the fixed bar element, wherein a first section of the electrical coil structure is wound in a first direction around a first area of the fixed bar element, and a second section of the electrical coil structure is wound in a second direction around a second area of the fixed bar element;
wherein the moveable bar element is moveably coupled to the fixed bar element.

13. The magnetic circuit of claim 12, wherein the first direction and the second direction are opposing directions.

14. The magnetic circuit of claim 12, wherein the electrical coil structure includes a middle section where the direction of winding is changed between the first direction and the second direction.

15. The magnetic circuit of claim 14, wherein the middle section is attached to the fixed bar element.

16. The magnetic circuit of claim 12, wherein the moveable bar element further comprises at least one soft magnet wherein at least one of the first hard magnet or the second hard magnet is positioned between the at least one soft magnet and the fixed bar element.

17. The magnetic circuit of claim 12, wherein the moveable bar element is moveably coupled to the fixed bar element by at least one bearing that is positioned between at least one first groove and at least one second groove.

18. The magnetic circuit of claim 12, further comprising an additional moveable bar element separated from the moveable bar element by the fixed bar element wherein the additional moveable bar element is moveably coupled to the fixed bar element and includes at least a third hard magnet and a fourth hard magnet.

19. An actuator, comprising:
a fixed body element, including at least one first groove and at least one electrical coil;
a moveable body element, including at least one second groove and a first and second hard magnet; and
at least one cube bearing positioned between the at least one first groove and the at least one second groove that separates the moveable body element from the fixed body element;
wherein the moveable body element is magnetically attracted toward the fixed body element and at least one of the at least one first groove or the at least one second groove is curved such that applying a lateral force to the moveable body element causes the at least one cube bearing to move the moveable body element laterally with respect to the fixed body element.

20. The actuator of claim 19, wherein ceasing to apply the lateral force causes the at least one cube bearing to move the moveable body element laterally with the fixed body element to return to an original position.

* * * * *